(12) United States Patent
Arai

(10) Patent No.: US 11,868,408 B2
(45) Date of Patent: Jan. 9, 2024

(54) INFORMATION PROCESSING METHOD AND INFORMATION PROCESSING SYSTEM

(71) Applicant: Panasonic Intellectual Property Management Co., Ltd., Osaka (JP)

(72) Inventor: Toshiya Arai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 40 days.

(21) Appl. No.: 17/523,128

(22) Filed: Nov. 10, 2021

(65) Prior Publication Data

US 2022/0067096 A1 Mar. 3, 2022

Related U.S. Application Data

(63) Continuation of application No. PCT/JP2020/021750, filed on Jun. 2, 2020.

(30) Foreign Application Priority Data

Jul. 12, 2019 (JP) ................. 2019-129824

(51) Int. Cl.
*G06F 16/00* (2019.01)
*G06F 16/909* (2019.01)
(Continued)

(52) U.S. Cl.
CPC .......... *G06F 16/909* (2019.01); *G06F 16/335* (2019.01); *G06F 16/9035* (2019.01)

(58) Field of Classification Search
CPC .................................................. G06F 16/335
See application file for complete search history.

(56) References Cited

U.S. PATENT DOCUMENTS

2017/0032248 A1 2/2017 Dotan-Cohen et al.
2019/0050936 A1* 2/2019 Hachisuka ......... G01C 21/3697
(Continued)

FOREIGN PATENT DOCUMENTS

JP 2016-94044 5/2016
JP 2019-215629 12/2019
(Continued)

OTHER PUBLICATIONS

Extended European Search Report dated Jul. 8, 2022 in corresponding European Patent Application No. 20839963.4.
(Continued)

*Primary Examiner* — Ajith Jacob
(74) *Attorney, Agent, or Firm* — Wenderoth, Lind & Ponack, L.L.P.

(57) ABSTRACT

An information processing method executed by a computer includes: obtaining (i) activity data of a user at a predetermined time point, (ii) profile data of one of the user and a different user who has an attribute that is identical to or similar to an attribute of the user, the profile data indicating one of an activity and a characteristic, and (iii) mobile object data; generating activity demand data of the user after the predetermined time point, in accordance with the profile data and the activity data of the user at the predetermined time point; determining a mobile object candidate that is to be recommended to the user, in accordance with the activity demand data of the user and the mobile object data; and controlling notification about the mobile object candidate.

14 Claims, 25 Drawing Sheets

(51) Int. Cl.
*G06F 16/9035* (2019.01)
*G06F 16/335* (2019.01)

(56) References Cited

U.S. PATENT DOCUMENTS

| | | |
|---|---|---|
| 2019/0213513 A1 | 7/2019 | Seacat Deluca et al. |
| 2020/0104881 A1 | 4/2020 | Yasui et al. |
| 2020/0104964 A1 | 4/2020 | Yasui et al. |

FOREIGN PATENT DOCUMENTS

| | | |
|---|---|---|
| WO | 03/009176 | 1/2003 |
| WO | 2018/230677 | 12/2018 |

OTHER PUBLICATIONS

International Search Report dated Jul. 7, 2020 in International (PCT) Application No. PCT/JP2020/021750.

\* cited by examiner

FIG. 2A

| User ID | Service ID |
|---|---|
| UABC1 | SXYZ1 |
| ... | ... |

FIG. 2B

| User ID | Profile data 1 | Profile data 2 | ... |
|---|---|---|---|
| UABC1 | 7:00 to 8:00 on weekday, home, makeup | Easy motion sickness | ... |
| ... | ... | ... | ... |

FIG. 2C

| User ID | Activity data 1 | Activity data 2 | ... |
|---|---|---|---|
| UABC1 | 7:30 on 5/1 (Mon.), home | 8:30 on 5/1 (Mon.), train | ... |
| ... | ... | ... | ... |

INFORMATION PROCESSING METHOD AND INFORMATION PROCESSING SYSTEM

CROSS REFERENCE TO RELATED APPLICATION(S)

This is a continuation application of PCT International Application No. PCT/JP2020/021750 filed on Jun. 2, 2020, designating the United States of America, which is based on and claims priority of Japanese Patent Application No. 2019-129824 filed on Jul. 12, 2019, The entire disclosures of the above-identified applications, including the specifications, drawings and claims are incorporated herein by reference in their entirety.

FIELD

The present disclosure relates to an information processing method for information related to a mobile object.

BACKGROUND

A technology for providing a service using a mobile object is known (Patent Literature [PTL] 1).

CITATION LIST

Patent Literature

PTL 1: WO 2018/230677

SUMMARY

Technical Problem

A user who uses the aforementioned conventional technology is to make a request to use a mobile object before using the mobile object. However, a demand of the user is to use, with very little effort, the mobile object that meets an activity demand of the user.

In response to this, it is an object of the present disclosure to provide an information processing method and an information processing system that allow a user to use a mobile object that meets an activity demand of the user without an explicit request from the user for use of the mobile object.

Solution to Problem

In accordance with an aspect of the present disclosure, an information processing method executed by a computer includes: obtaining (i) activity data of a user at a predetermined time point, (ii) profile data of one of the user and a different user who has an attribute that is identical to or similar to an attribute of the user, the profile data indicating one of an activity and a characteristic, and (iii) mobile object data; generating activity demand data of the user after the predetermined time point, in accordance with the profile data and the activity data of the user at the predetermined time point; determining a mobile object candidate that is to be recommended to the user, in accordance with the activity demand data of the user and the mobile object data; and controlling notification about the mobile object candidate.

In accordance with another aspect of the present disclosure, an information processing method executed by a computer includes: transmitting a request for activity demand data of a user; receiving the activity demand data of the user as a response to the request; obtaining mobile object data; determining a mobile object candidate that is to be recommended to the user, in accordance with the activity demand data of the user and the mobile object data; and notifying the user about the mobile object candidate.

In accordance with still another aspect of the present disclosure, an information processing system includes: an obtainer that obtains (i) activity data of a user at a predetermined time point, (ii) profile data of one of the user and a different user who has an attribute that is identical to or similar to an attribute of the user, the profile data indicating one of an activity and a characteristic, and (iii) mobile object data; a generator that generates activity demand data of the user after the predetermined time point, in accordance with the profile data and the activity data of the user at the predetermined time point; a determiner that determines a mobile object candidate that is to be recommended to the user, in accordance with the activity demand data of the user and the mobile object data; and a controller that controls notification about the mobile object candidate.

Advantageous Effects

The information processing method and the information processing system according to the present disclosure allow a user to use a mobile object that meets an activity demand of the user without an explicit request from the user for use of the mobile object.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A illustrates an example of a data structure of a first correspondence table according to Embodiment 1.

FIG. 2B is an example of a data structure of a second correspondence table according to Embodiment 1.

FIG. 2C is an example of a data structure of a third correspondence table according to Embodiment 1.

DESCRIPTION OF EMBODIMENTS

Figure 1:
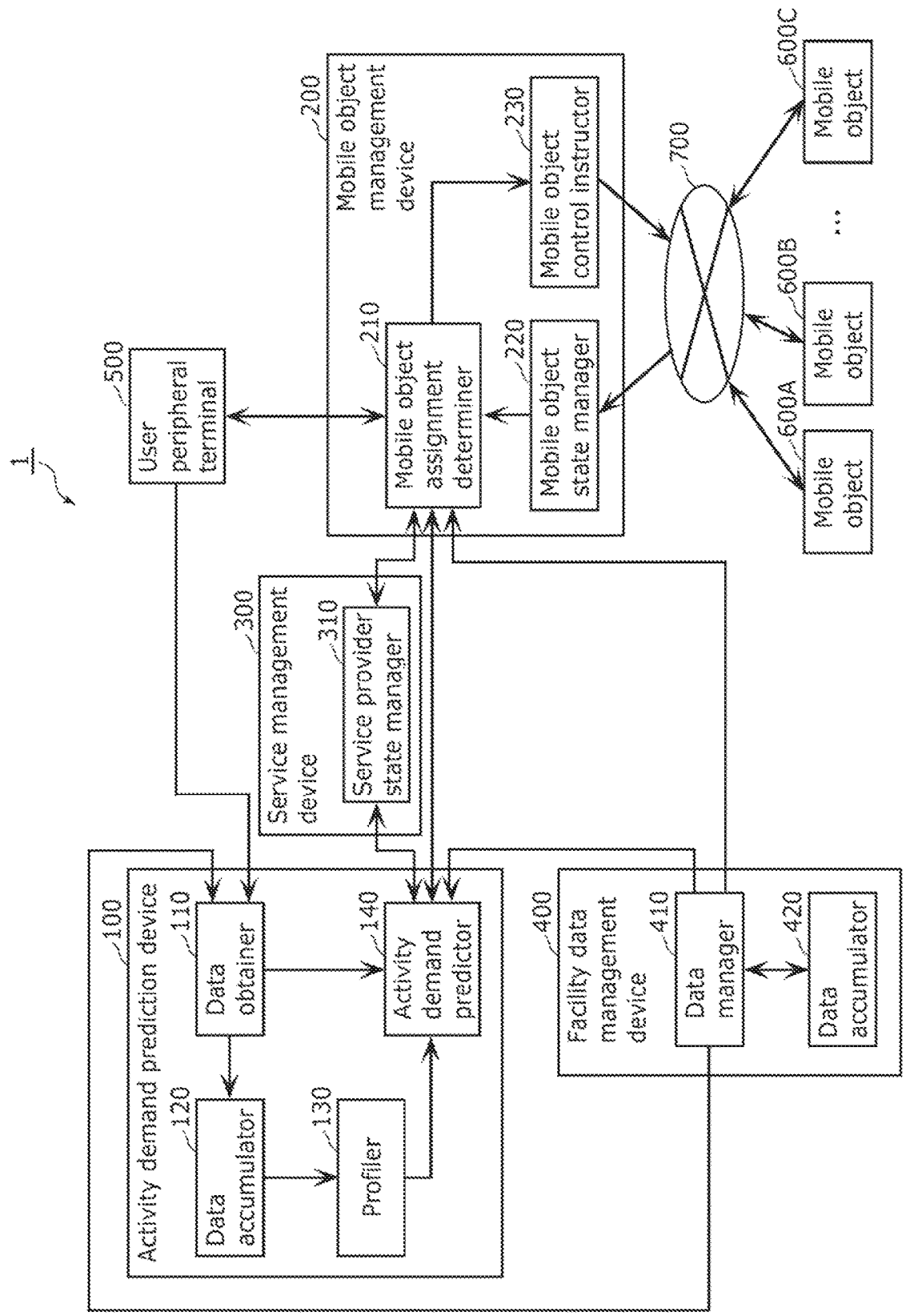
FIG. 1 is a block diagram illustrating a configuration of an information processing system according to Embodiment 1.

[Background to Development in Aspect According to the Present Disclosure]

In recent years, a ride sharing service and the like for mobile objects have started to spread. This suggests the advent of a society where traveling using such a mobile service without owing mobile means becomes common. In such a society, a user who uses a mobile object is expected to demand to use, with very little effort, the mobile object that meets an activity demand of the user. In response to this, the inventors earnestly studied and repeated experiments to implement a method that allows a user to use a mobile object that meets an activity demand of the user without an explicit request from the user for use of the mobile object. As a result, the inventors conceived an information processing method and an information processing system in an aspect according to the present disclosure as described below.

In accordance with an aspect of the present disclosure, an information processing method executed by a computer includes: obtaining (i) activity data of a user at a predetermined time point, (ii) profile data of one of the user and a different user who has an attribute that is identical to or similar to an attribute of the user, the profile data indicating one of an activity and a characteristic, and (iii) mobile object data; generating activity demand data of the user after the predetermined time point, in accordance with the profile data and the activity data of the user at the predetermined time point; determining a mobile object candidate that is to be recommended to the user, in accordance with the activity demand data of the user and the mobile object data; and controlling notification about the mobile object candidate.

The information processing method described above includes generating the activity demand data of the user and determining the mobile object candidate that is to be recommended to the user in accordance with the activity demand data generated, without an explicit request from the user for use of a mobile object. Thus, the information processing method allows the user to use the mobile object that meets an activity demand of the user without an explicit request from the user for use of the mobile object.

It is possible that in the determining of the mobile object candidate, a mobile object that enables an activity related to the activity demand data of the user inside the mobile object is determined as the mobile object candidate. It is thereby possible to determine, as a mobile object candidate, a mobile object that satisfies an activity demand of the user inside the mobile object.

It is also possible that the activity data of the user at the predetermined time point includes a first geographical location, the mobile object data includes a second geographical location, and in the determining of the mobile object candidate, a mobile object that is located within a predetermined distance from the user is determined as the mobile object candidate in accordance with the first geographical location. It is thereby possible to determine, as a mobile object candidate, a mobile object that is located in the vicinity of the user.

It is further possible that the information processing method further includes: obtaining facility data; and searching for a facility candidate that is to be recommended to the user; in accordance with the activity demand data of the user and the facility data, wherein the controlling of the notification is performed in accordance with a result of the searching for the facility candidate. It is thereby possible to determine whether or not to notify a mobile object candidate in accordance with a result of searching for a facility candidate to be recommended to the user.

It is further possible that wherein in the controlling of the notification, the mobile object candidate is notified when the faci is not found within the predetermined distance from the user in the searching. It is thereby possible to provide notification about a mobile object candidate when no facility candidate is found in the vicinity of the user.

It is further possible that the controlling of the notification is performed in accordance with a use condition of the facility candidate found in the searching and the profile data. It is thereby possible to determine whether or not to notify a mobile object candidate in accordance with a use condition of a facility candidate found in searching and profile data of the user.

It is further possible that in the determining of the mobile object candidate, at least one mobile object candidate is determined, as the mobile object candidate, from among a plurality of mobile object candidates in accordance with the activity demand data. It is thereby possible to narrow down mobile object candidates from among a plurality of mobile object candidates in accordance with profile data of the user.

It is further possible that the information processing method further includes: obtaining service provider data; and performing matching between the activity demand of the user and a service provider, in accordance with the activity demand data of the user and the service provider data, wherein the determining of the mobile object candidate is performed in accordance with a result of the performing of the matching. It is thereby possible to determine a mobile object candidate in accordance with a result of the performance of the matching between an activity demand of the user and a service provider.

It is further possible that the information processing method further includes: obtaining service provider data;

and searching for a service provider that is capable of providing a service corresponding to an activity related to the activity demand of the user, in accordance with the activity demand data of the user and the service provider data, wherein the determining of the mobile object candidate is performed in accordance with a result of the searching. It is thereby possible to determine, as a mobile object candidate, a mobile object that is capable of providing service corresponding to an activity demand of the user.

It is further possible that the information processing method further includes: obtaining (i) activity data of a different user, other than the user, at the predetermined time point, and (ii) profile data of one of the different user and an other user who has an attribute that is identical to or similar to an attribute of the different user; generating activity demand data of the different user after the predetermined time point, in accordance with: the profile data of the one of the different user and the other user who has the attribute that is identical to or similar to the attribute of the different user; and the activity data of the different user at the predetermined time point; and determining the mobile object candidate as a candidate that is to be recommended to the different user, when the activity demand data of the user is identical to or similar to the activity demand data of the different user. It is thereby possible to recommend a mobile object candidate to another user having an activity demand that is identical or similar to an activity demand of a target user.

It is further possible that the information processing method further includes: receiving one of a service identifier and location information; generating the activity demand data of the user, in accordance with (i) the activity data of the user at the predetermined time point and (ii) the profile data of the user identified by one of the service identifier and the location information; and transmitting the activity demand data generated in the generating, in response to the receiving. It is thereby possible to transmit mobile object data of a mobile object candidate to be recommended to a user identified by a received service identifier or received location information, in response to the receiving of the service identifier or position information.

It is further possible that the information processing method further includes: receiving identification information that identifies target activity demand data; determining whether the target activity demand data identified by the identification information matches the activity demand data of the user which is generated in the generating; obtaining a user identifier that identifies the user corresponding to the target activity demand data when the target activity demand data is determined to match the activity demand data of the user which is generated; and transmitting the mobile object data of the mobile object candidate in response to the receiving. It is thereby possible to transmit user identification information indicating a user having an activity demand that matches an activity demand identified by identification information, in response to receiving of the identification information.

In accordance with another aspect of the present disclosure, n information processing method executed by a computer includes: transmitting a request for activity demand data of a user; receiving the activity demand data of the user as a response to the request; obtaining mobile object data; determining a mobile object candidate that is to be recommended to the user, in accordance with the activity demand data of the user and the mobile object data; and notifying the user about the mobile object candidate.

The information processing method described above includes receiving the activity demand data of the user and determining the mobile object candidate that is to be recommended to the user in accordance with the activity demand data received, without an explicit request from the user for use of a mobile object. Thus, the information processing method allows the user to use the mobile object that meets an activity demand of the user without an explicit request from the user for use of the mobile object.

In accordance with still another aspect of the present disclosure, an information processing system includes: an obtainer that obtains (i) activity data of a user at a predetermined time point, (ii) profile data of one of the user and a different user who has an attribute that is identical to or similar to an attribute of the user, the profile data indicating one of an activity and a characteristic, and (iii) mobile object data; a generator that generates activity demand data of the user after the predetermined time point, in accordance with the profile data and the activity data of the user at the predetermined time point; a determiner that determines a mobile object candidate that is to be recommended to the user, in accordance with the activity demand data of the user and the mobile object data; and a controller that controls notification about the mobile object candidate.

The information processing system described above enables the activity demand data of the user to be generated and enables the mobile object candidate that is to be recommended to the user to be determined in accordance with the activity demand data generated, without an explicit request from the user for use of a mobile object. Thus, the information processing system allows the user to use the mobile object that meets an activity demand of the user without an explicit request from the user for use of the mobile object.

Hereinafter, certain exemplary embodiments of the information processing and the information processing system according to aspects of the present disclosure will be described with reference to the accompanying Drawings. The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Note that the respective figures are schematic diagrams and are not necessarily precise illustrations.

These general and specific aspects may be implemented to a system, a method, an integrated circuit, a computer program, or a computer-readable recording medium such as a Compact Disc-Read Only Memory (CD-ROM), or may be any combination of them.

Embodiment 1

The following describes an information processing system according to Embodiment 1. This information processing system predicts a profile of a user who uses the information processing system, from a previous activity pattern of the user. In accordance with the predicted profile and an activity pattern of the user at a predetermined time point, the information processing system predicts an activity demand of the user. Then, the information processing system provides the user with a mobile object capable of meeting the predicted activity demand.

[1-1. Configuration of Information Processing System]

FIG. 1 is a block diagram illustrating a configuration of information processing system 1 according to Embodiment 1.

As illustrated in FIG. 1, information processing system 1 includes activity demand prediction device 100, mobile object management device 200, service management device 300, facility data management device 400, user peripheral terminal 500, a plurality of mobile objects 600, and network 700. In the present embodiment, mobile object 600A, mobile object 600B, and mobile object 600C illustrated in FIG. 1 correspond to the plurality of mobile objects 600. In the following, mobile object 600A, mobile object 600B, and mobile object 600C illustrated in FIG. 1 are also collectively referred to as mobile object 600. Although only one user peripheral terminal 500 is illustrated in FIG. 1, information processing system 1 actually includes at least one user peripheral terminal 500.

Mobile object 600 is a movable device. Mobile object 600 is communicably connected to mobile object management device 200 via network 700. Mobile object management device 200 manages an operation of mobile object 600. Mobile object 600 may be any movable device. For example, mobile object 600 may include a space in which a user can perform a creative activity. Mobile object 600 may include a studio or a pottery space, for instance. Mobile object 600 may be a vehicle, such as a passenger car, a bus, or a train, for example. Mobile object 600 may be a drone for instance. If mobile object 600 is a vehicle, this vehicle may include a powder room or a space for relaxation (such as footbath). The vehicle may be a mobile hotel that includes a sleeping space, or a mobile kitchen that includes a kitchen, for example. The vehicle may be a mobile studio that includes a sound studio, or a mobile boutique that includes a retail space for clothing, accessories, and the like. The vehicle may be a mobile tea ceremony room that includes a tea ceremony room, or a mobile office that includes an office space provided with a desk, a monitor, and the like. The vehicle may be a mobile gym that includes sports equipment. The vehicle may take a passenger to a destination, for example. The vehicle may be a mobile restaurant that includes a dining space or an eating-drinking space, or a mobile childcare facility that includes a play area or a childcare space.

User peripheral terminal 500 is a device that obtains activity data indicating an activity of a user who uses information processing system 1, and that transmits the obtained activity data to activity demand prediction device 100. User peripheral terminal 500 may be any device that is capable of obtaining the activity data and transmits the obtained activity data to activity demand prediction device 100. For example, user peripheral terminal 500 may be: a mobile terminal carried by the user, such as a smartphone; a device placed in a home of the user; or a device placed in mobile object 600. If user peripheral terminal 500 is a device placed in the home of the user for instance, this device may be: a light in a powder room; a household electrical appliance, such as a refrigerator, a washing machine, or an air conditioner; a cooking appliance, such as a gas stove, a microwave oven, or an electric pot; audiovisual equipment, such as a television set or a video device; an information technology device, such as a personal computer or a tablet computer; a camera that captures an image inside a room; an audio input device included in a device placed in the home; a text input device included in a device place in the home; a controller that controls a device placed in the home; or a power distribution device placed in the home. If user peripheral terminal 500 is a device placed in mobile object 600 for instance, this device may be a sensor or the like, a battery device, or a power generation device that is placed in mobile object 600.

The activity data transmitted by user peripheral terminal 500 may be context information about an activity of the user, for instance. For example, the context information about the activity of the user may indicate a location of the user in association with a time. The location of the user may be calculated from GPS information or a usage history of a device used by the user, for instance.

The activity data transmitted by user peripheral terminal 500 may be information indicating an activity of the user at home or information indicating a usage status of a device in the home, for instance. To be more specific, the information may indicate that the user wears makeup and leaves home at xx o'clock to go to xx during this season or over the last one month, for instance. Such information may be calculated from an operating status of a device placed in the home, such as a household electrical appliance or a light (information indicating that a light in a washroom is turned on, for instance). Alternatively, such information may be calculated from a usage status of infrastructure (such as water, gas, and electricity) for instance.

The activity data transmitted by user peripheral terminal 500 may be information indicating an activity of the user inside mobile object 600, for instance. To be more specific, the information may indicate that the user usually reapplies makeup in mobile object 600, for instance. Such information may be calculated from activity recognition processing based on an image captured by a camera placed in mobile object 600. Alternatively, the activity data transmitted by user peripheral terminal 500 may be information indicating a result of an activity of the user inside mobile object 600, for instance. To be more specific, if a creative activity is performed in mobile object 600 for instance, information about the result of the activity (such as an image of a creation) may be calculated from activity recognition processing and object recognition processing based on the image captured by the camera placed in mobile object 600.

The activity data transmitted by user peripheral terminal 500 may be information indicating usual timing of cooking, a level of cooking, a meal menu, and a dietary preference, for instance. Such information may be calculated from: an operating status of a household electrical appliance or a light (whether a kitchen light is turned on or off, or whether a human detecting sensor detects anyone in the kitchen); a purchase history of usual food items and the like; and a usage status of infrastructure (such as water, gas, and electricity) for instance.

The activity data transmitted by user peripheral terminal 500 may be information indicating a date and time when the user has spare time, for instance. For example, the date and time when the user has spare time may be a time of day when: change in activity is significant; no routine activity is performed; or the user has no plans. Such information may be calculated from pattern analysis of a usage status of a home device, such as a household electrical appliance, or from calendar schedule information accumulated in an electronic medium or cloud, for instance.

The activity data transmitted by user peripheral terminal 500 may be information indicating a preference of the user. To be more specific, the information may indicate that the user seems to be interested in stone oven pizza, shopping in a specific genre, tea ceremony, or playing music, for instance. Such information may be calculated from a viewing history of content accumulated in a television set or a video recording apparatus, a book purchase history, a web browsing history, a conversation history, a history of participating in a tea ceremony class, a history of purchasing tea or the like, or a history of playing a musical instrument, for instance.

Service management device 300 manages a service enabled by mobile object 600. For example, service management device 300 is implemented by a server capable of communicating with external devices. Such communicable external devices include activity demand prediction device 100 and mobile object management device 200. The server includes a processor and a memory, for example. The processor achieves each function of service management device 300 by executing a program stored in the memory.

For example, the service enabled by mobile object 600 may be learning content for the tea ceremony class, a drawing class, or a pottery class held in mobile object 600 that is used as the mobile tea ceremony room including the tea ceremony room, the mobile studio including the studio, or the mobile pottery space including the pottery space. In such a case, the service may be provided by sending a person having a skill of teaching tea ceremony, drawing, or pottery to mobile object 600. Alternatively, the service may be provided through a video call with the person having the skill of teaching tea ceremony, drawing, or pottery. Or, the service may be provided in mobile object 600 by playing tutorial video content of tea ceremony, drawing, or pottery. Moreover, the service enabled by mobile object 600 may be learning content for a musical instrument playing class held in the mobile studio including the sound studio. In this case, the service may be provided by sending a person having a skill of teaching how to play an instrument to mobile object 600. Alternatively, the service may be provided through a video call with the person having the skill of teaching how to play the instrument. Or, the service may be provided in mobile object 600 by playing tutorial video content guiding how to play the instrument. Furthermore, the service enabled by mobile object 600 may allow the creative activity in mobile object 600 to be shared. In this case, after use, mobile object 600 including the studio may be used as a gallery sharing a painting created in this studio. Thus, the service may be provided by distributing the painting to different mobile object 600.

As illustrated in FIG. 1, service management device 300 includes service provider state manager 310.

Service provider state manager 310 manages a state of a service provider that provides a service. To be more specific, service provider state manager 310 manages service provider data that indicates the state of the service provider. For example, the service provider may be the person having the skill of teaching tea ceremony or the person having the skill of teaching how to play the instrument. The state of the service provider may be a schedule or availability of the service provider, for instance. Service provider state manager 310 is capable of communicating with activity demand prediction device 100 and mobile object management device 200.

Facility data management device 400 manages data about a facility used by the user. For example, facility data management device 400 is implemented by a server capable of communicating with external devices. Such communicable external devices include activity demand prediction device 100 and mobile object management device 200. The server includes a processor and a memory, for example. The processor achieves each function of facility data management device 400 by executing a program stored in the memory.

For example, the facility used by the user may be a yoga school, a sound studio, or a boutique.

As illustrated in FIG. 1, facility data management device 400 includes data manager 410 and data accumulator 420.

Data accumulator 420 stores: facility data indicating information about a facility used by the user; and activity data indicating an activity of the user in the facility.

The facility data is about use of the facility. For example, the facility data may include information indicating details of the service provided in the facility or information indicating equipment usable in the facility. For example, the facility data may include information indicating an activity demand that can be met in the facility or information indicating a geographical location of the facility.

Data manager 410 manages the facility data and the activity data stored in data accumulator 420. Moreover, data manager 410 is capable of communicating with activity demand prediction device 100 and mobile object management device 200.

Activity demand prediction device 100 predicts a profile of the user from a previous activity pattern of the user. In accordance with the predicted profile and an activity pattern of the user at a predetermined time point, activity demand prediction device 100 predicts an activity demand of the user. For example, activity demand prediction device 100 is implemented by a server capable of communicating with external devices. Such communicable external devices include activity demand prediction device 100, mobile object management device 200, service management device 300, facility data management device 400, and user peripheral terminal 500. The server includes a processor and a memory, for example. The processor achieves each function of activity demand prediction device 100 by executing a program stored in the memory.

As illustrated in FIG. 1, activity demand prediction device 100 includes data obtainer 110, data accumulator 120, profiler 130, and activity demand predictor 140.

Data obtainer 110 obtains activity data transmitted from user peripheral terminal 500, Moreover, data obtainer 110 may also obtain activity data transmitted from facility data management device 400.

Data accumulator 120 stores the activity data obtained by data obtainer 110 for each user. Moreover, data accumulator 120 stores a profile of the user predicted by profiler 130 that is described later, and an activity demand predicted by activity demand predictor 140 that is described later.

Profiler 130 predicts the profile of the user in accordance with the activity data stored in data accumulator 120. For example, profiler 130 may predict the profile in accordance with: information included in the user activity data and indicating a location of the user in association with a time; and information included in the user activity data and indicating an activity of the user at this time. Alternatively, profiler 130 may predict the profile by statistically processing information included in the user activity data and indicating a preference of the user.

The profile to be predicted may be characteristics of the user, for instance. Examples of the characteristics of the user may include having motion sickness easily, having a frequent urge to go to a bathroom, and frequently wanting to reapply makeup.

The profile to be predicted may be a behavioral tendency of the user, for instance. The behavioral tendency of the user may be a tendency indicated by a combination of a data and time, a location of the user, and an activity of the user, for example. To be more specific, the user may have a behavioral tendency to apply makeup in a powder room in the home of user 30 minutes before heading off to work on weekdays.

The profile to be predicted may be a preference of the user, for instance. Examples of the preference of the user may include an interest in stone oven pizza, playing a musical instrument, or working out at a gym.

Activity demand predictor 140 obtains the profile of the user predicted by profiler 130. In accordance with the obtained profile and the activity data of the user at a predetermined time point (at a present time, for instance) obtained by data obtainer 110, activity demand predictor 140 predicts an activity demand of the user after the predetermined time point. Then, activity demand predictor 140 generates activity demand data indicating the predicted activity demand. Activity demand predictor 140 transmits the generated activity demand data to mobile object management device 200, service management device 300, or facility data management device 400. For example, if description of the profile of the user who is a target of activity demand prediction is insufficient to predict the activity demand, activity demand predictor 140 may obtain, instead of the profile of this target user, a profile of a different user who has an attribute (such as gender, age, or occupation) that is identical to or similar to an attribute of this target user. Using the obtained profile of the different user, activity demand predictor 140 may predict the activity demand of the target user.

Activity demand predictor 140 may predict only one activity demand or a plurality of activity demands. If predicting a plurality of activity demands, activity demand predictor 140 may predict a profile of the user for each of the plurality of activity demands predicted and/or calculate an activity demand score indicating a matching level between the profile and the activity data of the user at the predetermined time point, for instance. For example, the activity demand score may be calculated in accordance with a frequency with which the activity is previously selected according to activity recognition, or in accordance with a prediction score of an activity demand prediction learning model.

For example, if a geographical location of the user is included in the activity data of the predetermined time point obtained by data obtainer 110, activity demand predictor 140 may include the geographical location of the user into the activity demand data to be generated.

Examples of the activity demand to be predicted may include: starting makeup now to go to work; trying stone oven cooking; going to a fashionable store; attending a tea ceremony class; playing music in the vicinity, which is even better if with someone; not going (avoiding going) to such and such a place; spending time alone.

For example, activity demand predictor 140 may receive a service ID that identifies a service enabled by mobile object 600 or location information indicating a geographical location of the user, from mobile object management device 200, service management device 300, or facility data management device 400. In this case, activity demand predictor 140 may predict the activity demand of the user after the predetermined time point in accordance with: the profile data of the user identified by the service ID or the location information; and the activity data of the user at the predetermined time point. Then, activity demand predictor 140 may generate activity demand data indicating the predicted activity demand, for instance. For example, activity demand predictor 140 may transmit the generated activity demand data, as a response to the above reception, to the device (mobile object management device 200, service management device 300, or facility data management device 400) that is a transmission source of the service ID or the location information described above.

Here, activity demand predictor 140 may store a first correspondence table that associates a user ID with a service ID, a second correspondence table that associates a user ID with a result of profiling, and a third correspondence table that associates a user ID with an activity pattern, for example. In this case, if receiving a service ID, activity demand predictor 140 may identify a user corresponding to the service ID by reference to the first correspondence table stored, the second correspondence table stored, or the third correspondence table stored. Then, activity demand predictor 140 may predict the activity demand of the user identified.

FIG. 2A illustrates an example of a data structure of the first correspondence table stored in activity demand predictor 140. FIG. 2B illustrates an example of a data structure of the second correspondence table stored in activity demand predictor 140. FIG. 2C illustrates an example of a data structure of the third correspondence table stored in activity demand predictor 140.

Here, if receiving location information for instance, activity demand predictor 140 may refer to latest activity data of each user stored in data accumulator 120 to identify a user corresponding to the location information. Then, activity demand predictor 140 may predict the activity demand of the user identified.

For example, activity demand predictor 140 may receive identification information that identifies activity demand data, from mobile object management device 200, service management device 300, or facility data management device 400. In this case, activity demand predictor 140 may determine whether the activity demand data identified by the received identification information matches the activity demand data previously generated. Then, activity demand predictor 140 may generate a user ID that identifies a user corresponding to the activity demand data that is determined as matching the activity demand data previously generated. Activity demand predictor 140 may transmit the generated user ID to the device (mobile object management device 200, service management device 300, or facility data management device 400) that is a transmission source of the identification information.

For example, activity demand predictor 140 may receive a user ID that identifies a user, from mobile object management device 200, service management device 300, or facility data management device 400. In this case, in accordance with profile data identified by the user ID received and the activity data of the user at the predetermined time point, activity demand predictor 140 may predict the activity demand of the user after the predetermined time point. Then, activity demand predictor 140 may generate activity demand data indicating the predicted activity demand, for instance. Activity demand predictor 140 may transmit the generated activity demand data to the device (mobile object management device 200, service management device 300, or facility data management device 400) that is a transmission source of the user ID.

Mobile object management device 200 assigns, to the user, mobile object 600 that meets the activity demand of the user predicted by activity demand prediction device 100. For example, mobile object management device 200 is implemented by a server capable of communicating with external devices. Such communicable external devices include activity demand prediction device 100, service management device 300, facility data management device 400, and user peripheral terminal 500. Moreover, mobile object management device 200 is communicably connected to the plurality of mobile objects 600 via network 700. The server includes a processor and a memory, for example. The processor achieves each function of mobile object management device 200 by executing a program stored in the memory.

As illustrated in FIG. 1, mobile object management device 200 includes mobile object assignment determiner 210, mobile object state manager 220, and mobile object control instructor 230.

Mobile object control instructor 230 transmits, to mobile object 600, a control instruction for mobile object 600. For example, if mobile object 600 that is a transmission destination of the control instruction is an autonomous driving vehicle, mobile object control instructor 230 may transmit a control command for autonomous driving. For example, if mobile object 600 that is a transmission destination of the control instruction is a vehicle driven manually by a driver riding in the vehicle, mobile object control instructor 230 may transmit, to the driver, documented driving instructions presenting driving instructions.

Mobile object state manager 220 manages a state of mobile object 600. To be more specific, mobile object state manager 220 receives mobile object data related to mobile object 600 from mobile object 600, and manages the mobile object data received.

For example, the mobile object data may include a mobile object ID that identifies mobile object 600, or include a geographical location of mobile object 600. For example, the mobile object data may include information indicating an operation schedule of mobile object 600, or information indicating an operation route of mobile object 600. For example, the mobile object data may include information indicating details of a service that can be provided by mobile object 600, or information indicating a usage status of mobile object 600.

Mobile object assignment determiner 210 obtains the activity demand data transmitted from activity demand prediction device 100. In accordance with the obtained activity demand data and the mobile object data managed by mobile object state manager 220, mobile object assignment determiner 210 determines a mobile object candidate that is to be recommended to the user. When determining the mobile object candidate, mobile object assignment determiner 210 may determine mobile object 600 individually, or determine a type of mobile object 600. Then, mobile object assignment determiner 210 controls notification about the determined mobile object candidate. Here, a receiver of the notification about the mobile object candidate through this notification control performed by mobile object assignment determiner 210 is user peripheral terminal 500 or service management device 300.

For example, mobile object assignment determiner 210 may determine, as the mobile object candidate, mobile object 600 that enables an activity related to the obtained activity demand data inside mobile object 600.

For example, the obtained activity demand data may include a geographical location of the user at a predetermined time point. More specifically, activity demand predictor 140 may include the geographical location of the user at the predetermined time point into the generated activity demand data when the activity data obtained by data obtainer 110 includes the geographical location of the user at the predetermined time point. In this case, if the mobile object data managed by mobile object state manager 220 includes a geographical location of mobile object 600, mobile object assignment determiner 210 may determine, as the mobile object candidate, mobile object 600 located within a predetermined distance from the user.

For example, if determining a plurality of mobile object candidates, mobile object assignment determiner 210 may determine at least one mobile object candidate about which notification is to be provided, from among the plurality of mobile object candidates, in accordance with the obtained activity demand data.

Mobile object assignment determiner 210 may also obtain facility data from facility data management device 400. In accordance with the obtained activity demand data and the obtained facility data, mobile object assignment determiner 210 may search for a facility candidate that is to be recommended to the user. Then, in accordance with the result of the search for the facility candidate, mobile object assignment determiner 210 may control notification about the mobile object candidate. In this case for instance, if no facility candidate is found within the predetermined distance from the user, mobile object assignment determiner 210 may control notification about the mobile object candidate so that the notification about the mobile object candidate is provided. In this case, mobile object assignment determiner 210 may control the notification about the mobile object candidate in accordance with a use condition of the mobile object candidate found and the activity demand data obtained.

Mobile object assignment determiner 210 may also obtain service provider data from service management device 300. In accordance with the obtained activity demand data and the obtained service provider data, mobile object assignment determiner 210 may perform matching between an activity demand of the user and a service provider. Then, mobile object assignment determiner 210 may determine the mobile object candidate in accordance with the result of the matching.

Mobile object assignment determiner 210 may also obtain service provider data from service management device 300. In accordance with the obtained activity demand data and the obtained service provider data, mobile object assignment determiner 210 may search for a service provider capable of providing a service corresponding to an activity related to the activity demand of the user. Then, in accordance with the result of the search, mobile object assignment determiner 210 may determine, as the mobile object candidate, mobile object 600 that is capable of providing this service.

As described above, mobile object assignment determiner 210 is capable of notifying, for example, user peripheral terminal 500 about the determined mobile object candidate. For example, mobile object assignment determiner 210 may notify user peripheral terminal 500 about the determined mobile object candidate by transmitting, to user peripheral terminal 500, mobile object recommendation information that recommends the determined mobile object candidate to the user.

Figure 3:
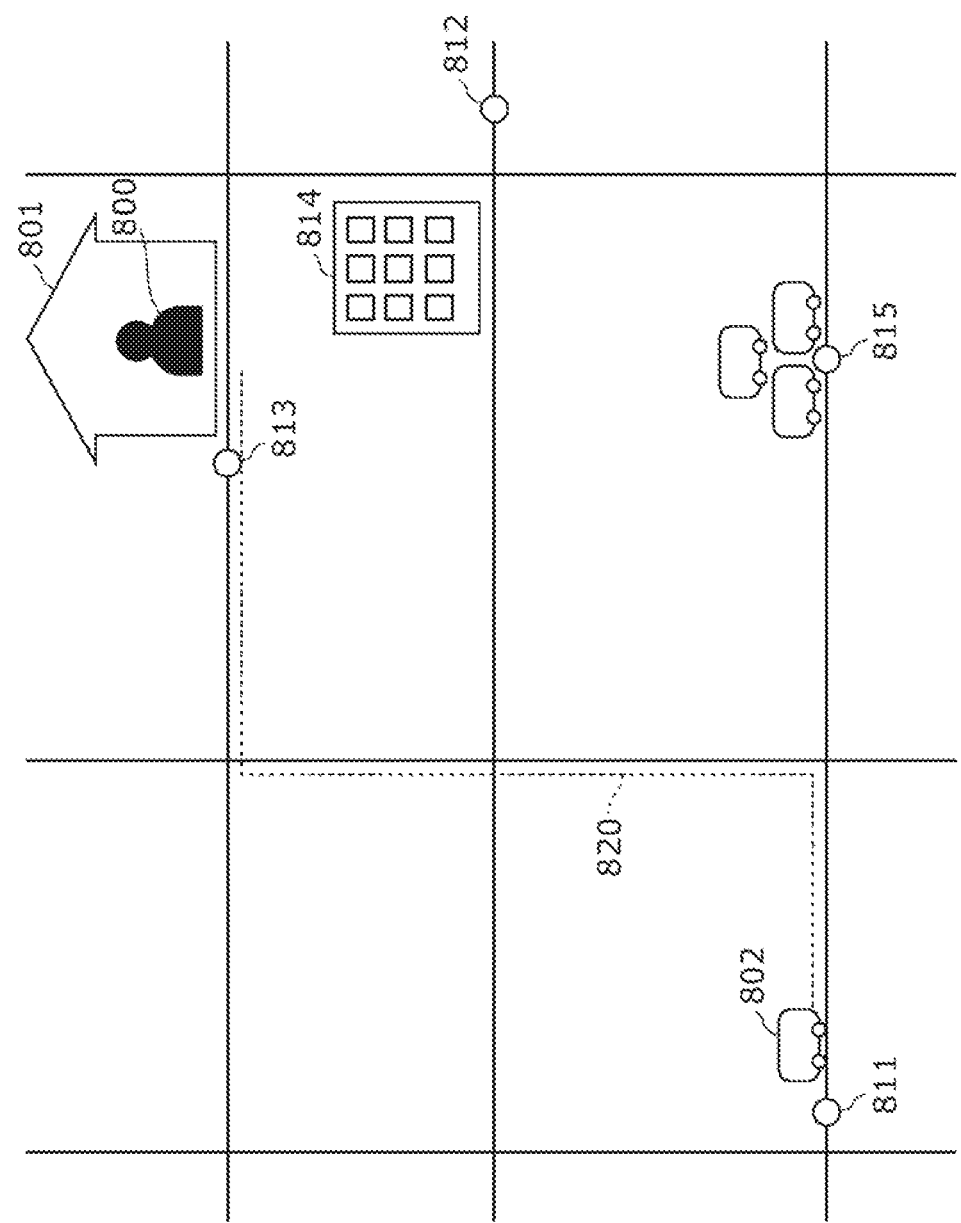
FIG. 3 schematically illustrates an example of content of mobile object recommendation information according to Embodiment 1.

FIG. 3 schematically illustrates an example of content of the mobile object recommendation information. In this example, note that the mobile object recommendation information includes a map image and that user peripheral terminal 500 includes an image display screen. For example, user peripheral terminal 500 that includes the image display screen may be a mobile terminal carried by the user, such as a smartphone, or a television set placed in the home of the user.

As illustrated in FIG. 3, the mobile object recommendation information may include information indicating location 811 of the mobile object candidate that is already stationary. For example, the mobile object recommendation information may include: information indicating location 811 of the mobile object candidate that is already stationary; and information indicating a means for transportation (by foot or bicycle) to a stop position or indicating travel route 820. For example, the mobile object recommendation information may include information indicating a vehicle park time and location 812 of a parking area where the mobile object candidate is to be parked. For example, the mobile object recommendation information may include information indicating a vehicle stop time and location 813 where the mobile object candidate is allowed to be stopped in the vicinity of the user. If a facility candidate is found, the mobile object recommendation information may include location 814 of the facility candidate found.

[1-2. Operation of Information Processing System]

The following describes an operation performed by information processing system 1 having the above configuration.

For example, information processing system 1 performs mobile object state management processing, activity demand prediction processing, first mobile object recommendation processing, second mobile object recommendation processing, first request-response processing, second request-response processing, third request-response processing, mobile object provision processing, third mobile object recommendation processing, first mobile object group recommendation processing, second mobile object group recommendation processing, and fourth mobile object recommendation processing.

These operations are described sequentially below.

The mobile object state management processing is first described with reference to the drawings.

The mobile object state management processing is performed to manage a state of mobile object 600.

Figure 4:
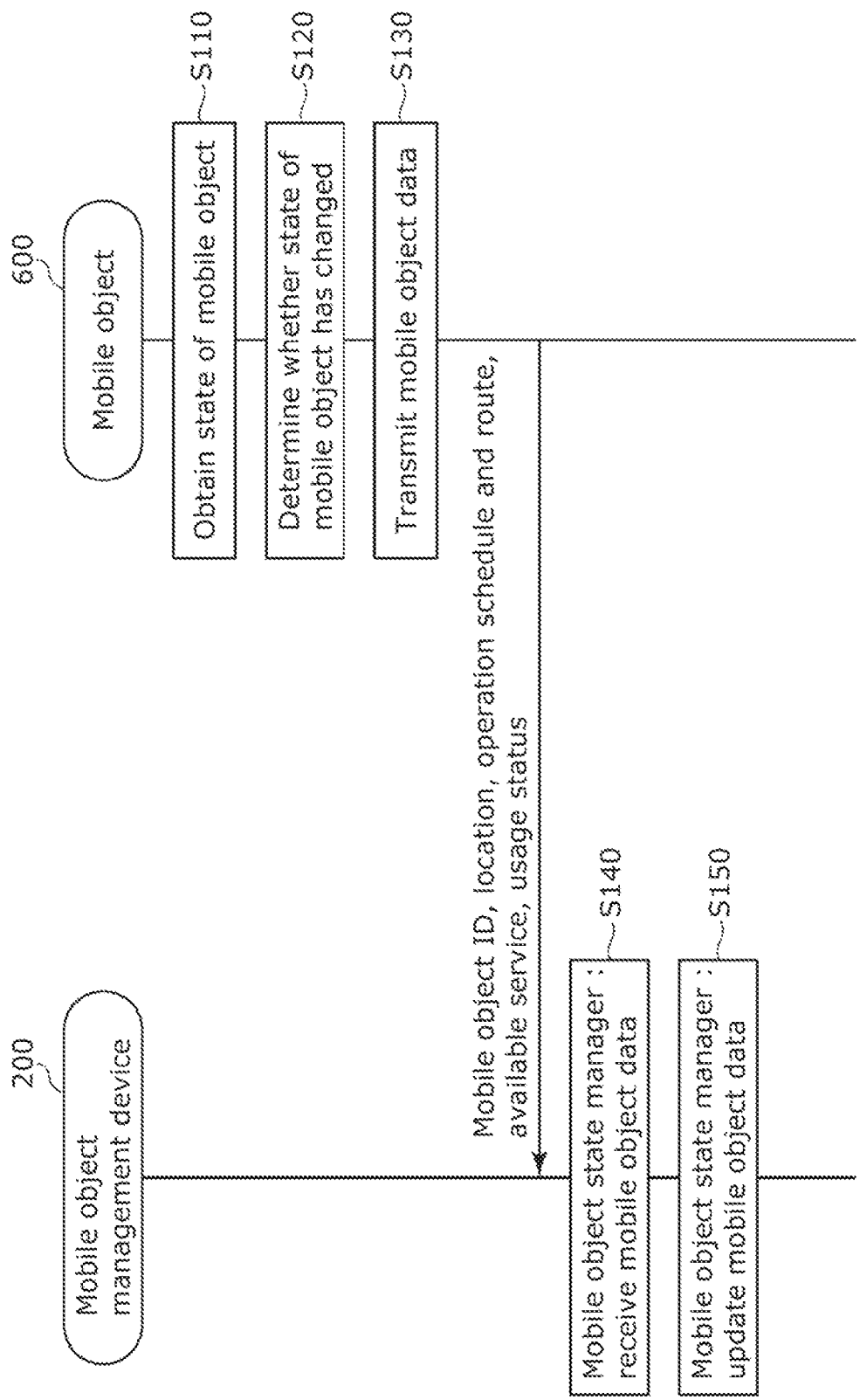
FIG. 4 is a sequence of mobile object state management processing according to Embodiment 1.
Figure 5:
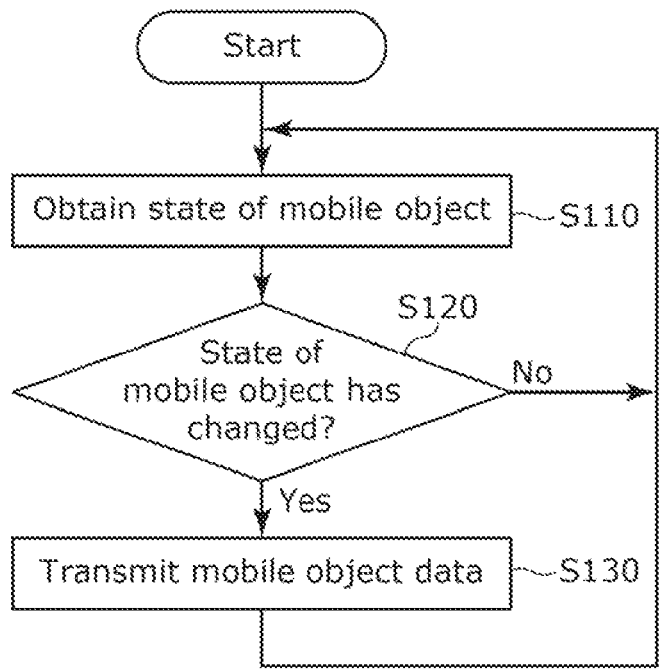
FIG. 5 is a flowchart of processing performed by a mobile object in the mobile object state management processing according to Embodiment 1.
Figure 6:
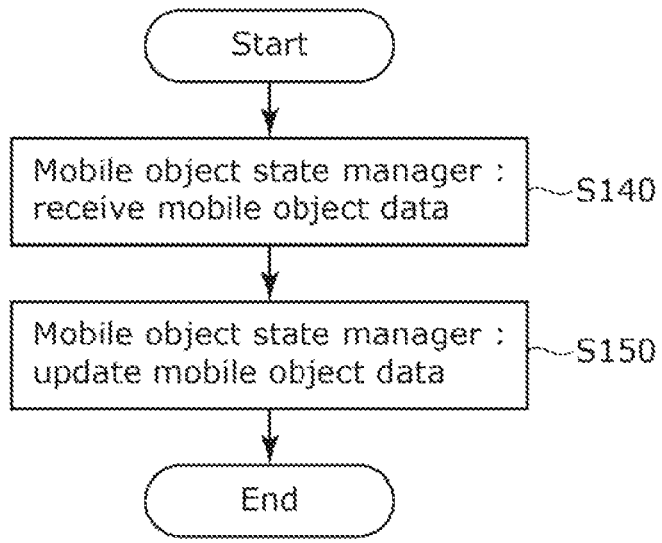
FIG. 6 is a flowchart of processing performed by a mobile object management device in the mobile object state management processing according to Embodiment 1.

FIG. 4 is a sequence of the mobile object state management processing. FIG. 5 is a flowchart of processing performed by mobile object 600 in the mobile object state management processing. FIG. is a flowchart of processing performed by mobile object management device 200 in the mobile object state management processing.

In the mobile object state management processing, mobile object 600 obtains a state of mobile object 600 itself (Step S110). Then, mobile object 600 determines whether the state of mobile object 600 has changed (Step S120).

If determining in step S120 that the state of mobile object 600 has changed (Step S120: Yes), mobile object 600 generates mobile object data and transmits the generated mobile object data to mobile object management device 200 (Step S130). In the present example, the mobile object data includes a mobile object ID that identifies mobile object 600, a geographical location of mobile object 600, an operation schedule of mobile object 600, an operation route of mobile object 600, information indicating details of a service that can be provided by mobile object 600, and information indicating a usage status of mobile object 600.

If it is determined in Step S120 that the state of mobile object 600 has not changed or when Step S120 ends, mobile object 600 returns to Step S110.

If mobile object 600 transmits the mobile object data, mobile object state manager 220 receives the transmitted mobile object data (Step S140), Then, mobile object state manager 220 updates the current mobile object data with the received mobile object data (Step S150).

Next, the activity demand prediction processing is described with reference to the drawings.

The activity demand prediction processing is performed to predict an activity demand of the user.

Figure 7:
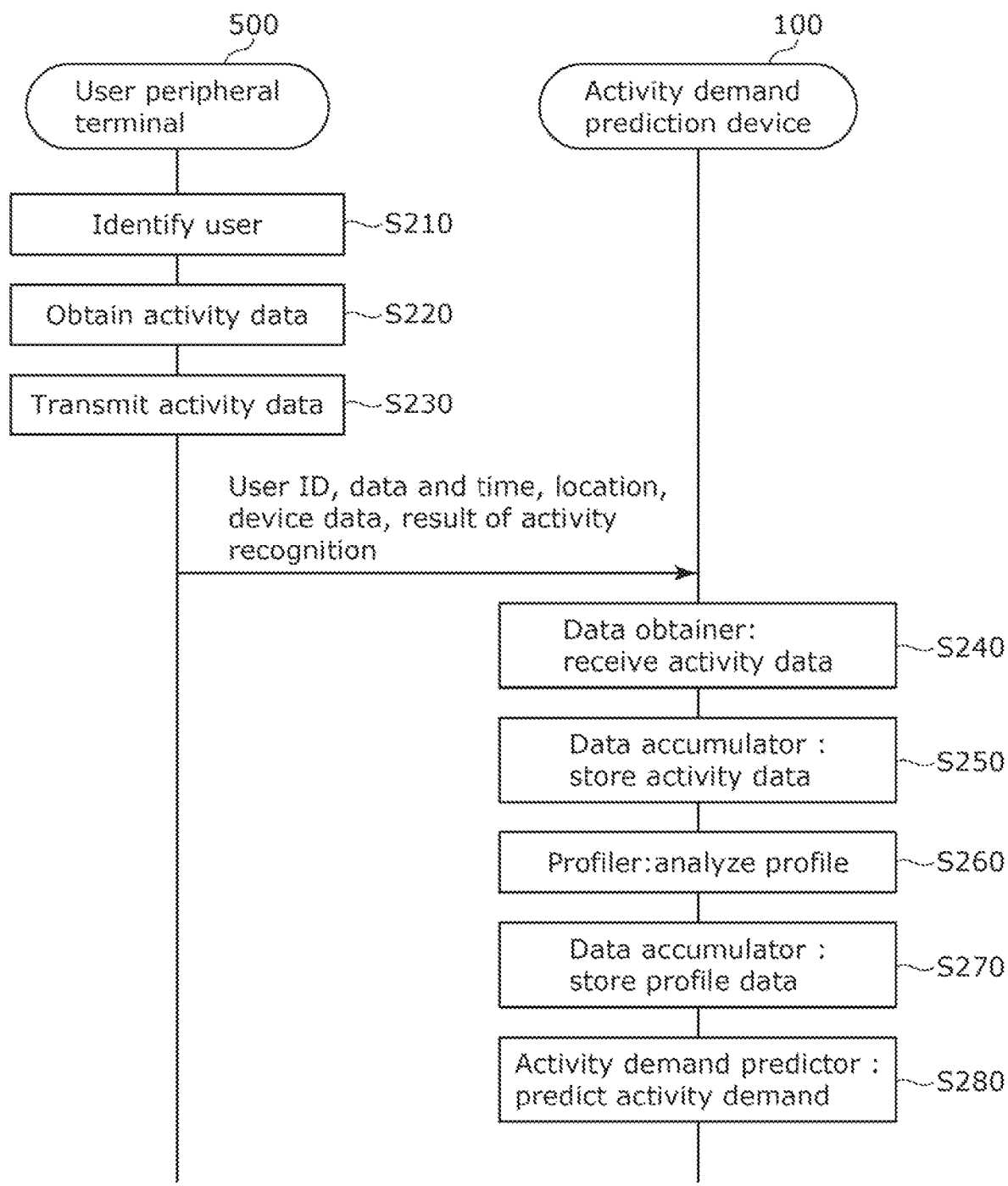
FIG. 7 is a sequence of activity demand prediction processing according to Embodiment 1.
Figure 8:
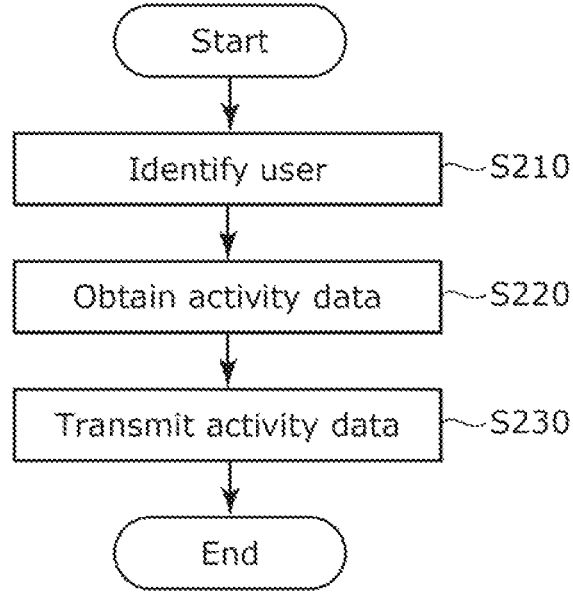
FIG. 8 is a flowchart of processing performed by a user peripheral terminal in the activity demand prediction processing according to Embodiment 1.
Figure 9:
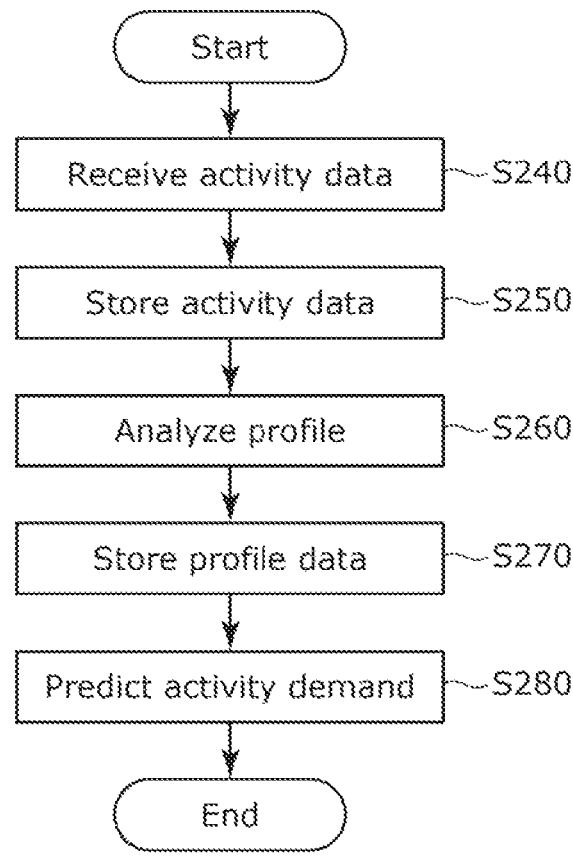
FIG. 9 is a flowchart of processing performed by an activity demand prediction device in the activity demand prediction processing according to Embodiment 1.

FIG. 7 is a sequence of the activity demand prediction processing. FIG. 8 is a flowchart of processing performed by user peripheral terminal 500 in the activity demand prediction processing. FIG. 9 is a flowchart of processing performed by activity demand prediction device 100 in the activity demand prediction processing.

In the activity demand prediction processing, user peripheral terminal 500 identifies the user (Step S210). For example, identification of the user is made through face recognition processing or a user input (such as an input of a password).

If the user is identified, user peripheral terminal 500 obtains the activity data of the user (Step S220). Here, if possible, user peripheral terminal 500 may obtain the activity data by performing activity recognition processing based on video in which the user is captured. In the present example, the activity data includes a user ID that identifies the user, a date and time, a geographical location of the user, device data of a device used by the user, and a result of the activity recognition processing performed on the user.

If obtaining the activity data, user peripheral terminal 500 transmits the obtained activity data to activity demand prediction device 100 (Step S230).

If the activity data is transmitted, data obtainer 110 receives the transmitted activity data (Step S240). Then, data accumulator 120 stores the obtained activity data (Step S250).

If the activity data is stored, profiler 130 predicts a profile of the user in accordance with the activity data stored in data accumulator 120 (Step S260). Then, data accumulator 120 stores the predicted profile of the user (Step S270).

If the profile is stored, activity demand predictor 140 predicts an activity demand of the user after the present time in accordance with the profile of the user stored in data accumulator 120 and the activity data of the user at the present time obtained by data obtainer 110 (Step S280).

Next, the first mobile object recommendation processing is described with reference to the drawings.

The first mobile object recommendation processing is performed to determine a mobile object candidate that is to be recommended to the user and then recommend the determined mobile object candidate to the user.

Figure 10:
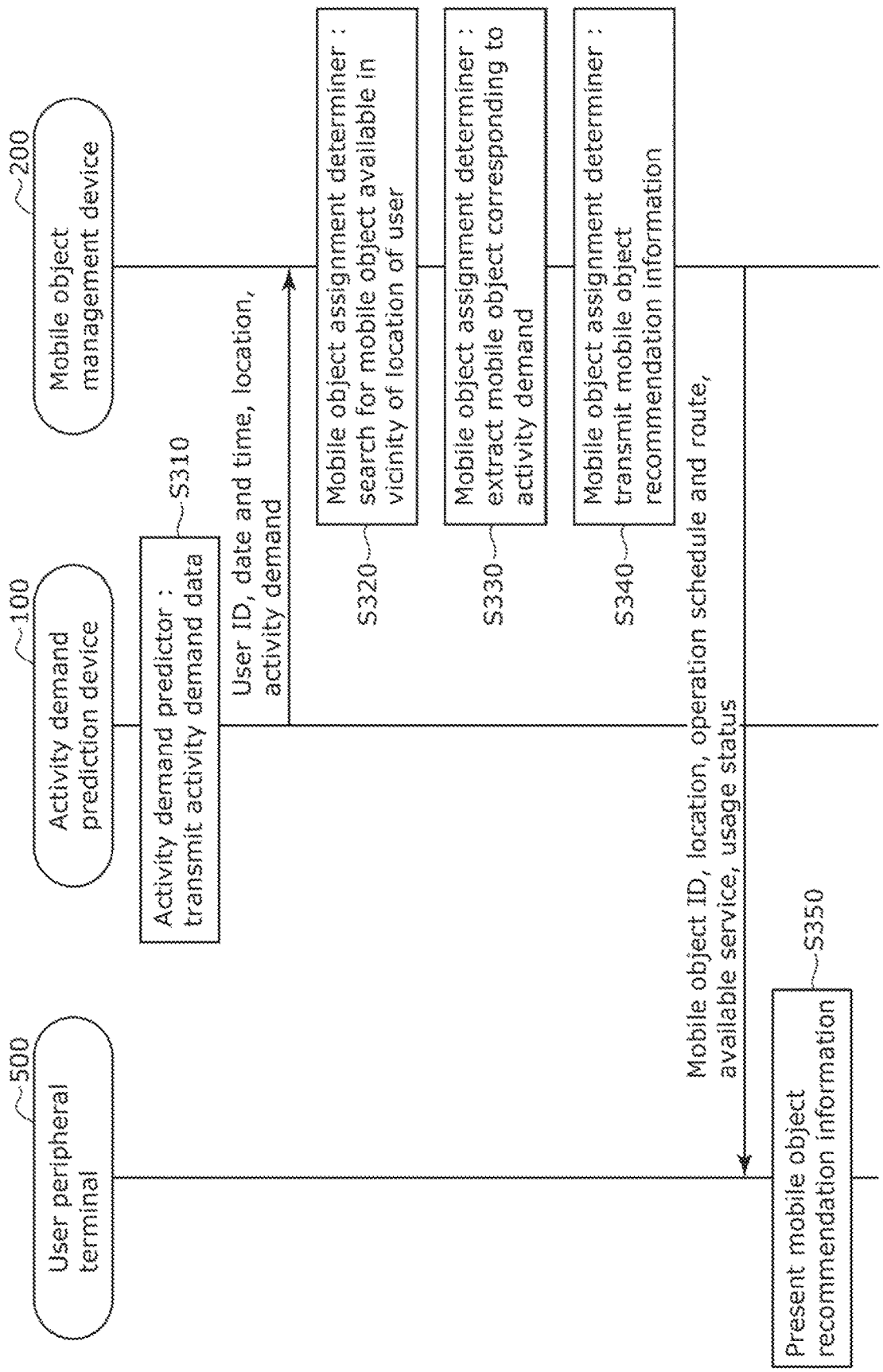
FIG. 10 is a sequence of first mobile object recommendation processing according to Embodiment 1.
Figure 11:
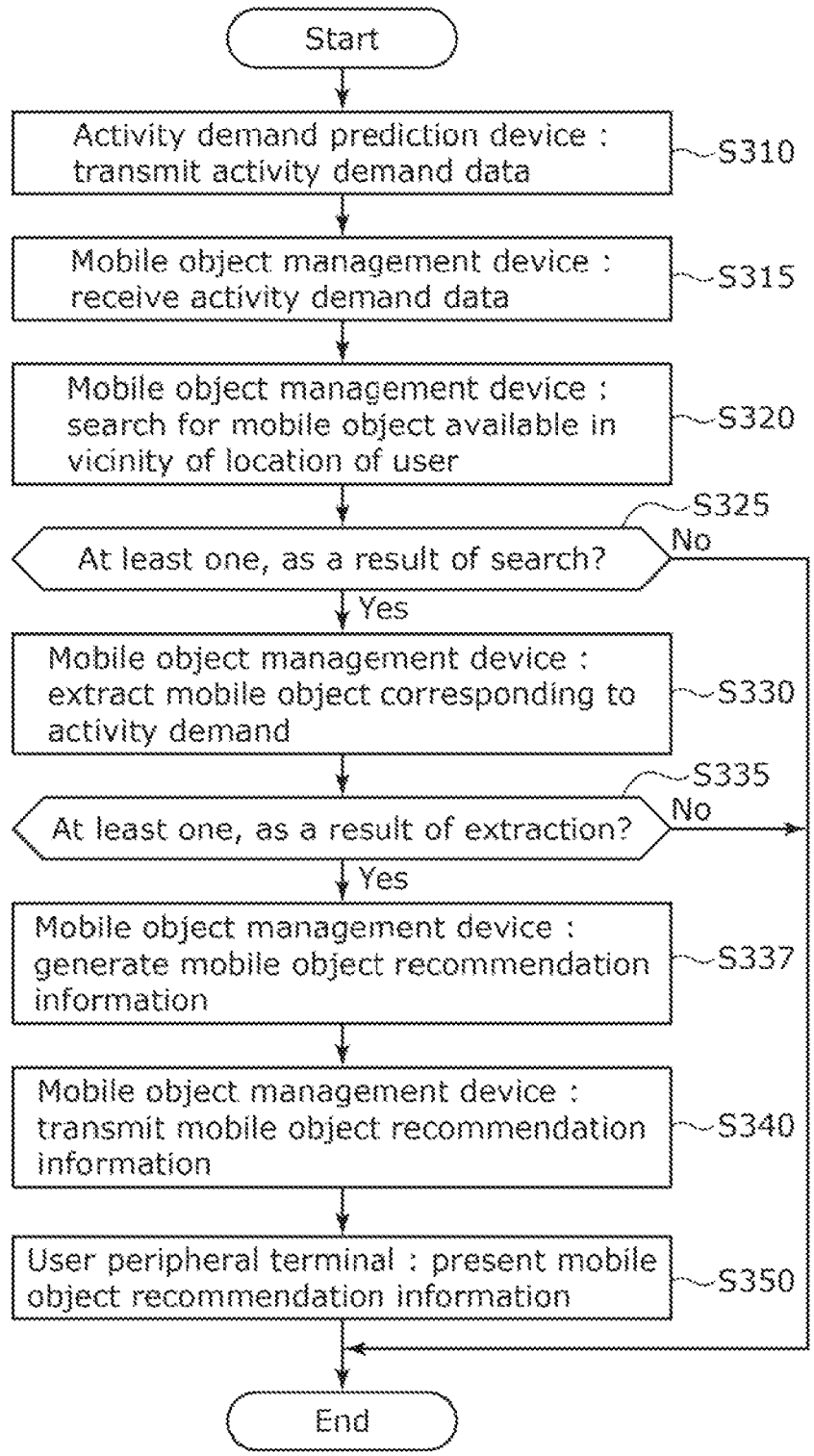
FIG. 11 is a flowchart of the first mobile object recommendation processing according to Embodiment 1.

FIG. 10 is a sequence of the first mobile object recommendation processing. FIG. 11 is a flowchart of the first mobile object recommendation processing.

In the first mobile object recommendation processing, activity demand predictor 140 generates activity demand data indicating the predicted activity demand. For example, activity demand predictor 140 may predict the activity demand through the execution of the activity demand prediction processing described above. In the present example, the activity demand data includes a user ID that identifies the user, a date and time, a geographical location of the user, and at least one activity demand.

After generating the activity demand data, activity demand predictor 140 transmits the generated activity demand data to mobile object management device 200 (Step S310).

If the activity demand data is transmitted, mobile object assignment determiner 210 receives the transmitted activity demand data (Step S315). In accordance with the received activity demand data, mobile object assignment determiner 210 searches for mobile object 600 available in the vicinity of the location of the user (Step S320). Then, mobile object assignment determiner 210 checks whether at least one available mobile object 600 is found in the vicinity of the location of the user as a result of the search (Step S325).

If the at least one available mobile object 600 is found in the vicinity of the location of the user in Step S325 (Step S325: Yes), mobile object assignment determiner 210 extracts mobile object 600 corresponding to the activity demand of the user from among the at least one available mobile object 600 found in the vicinity of the location of the user (Step S330). Then, mobile object assignment determiner 210 checks whether at least one mobile object 600 corresponding to the activity demand of the user is found as a result of the extraction (Step S335). Here, mobile object assignment determiner 210 may previously store a correspondence list between an activity demand and mobile object 600. Using this correspondence list, mobile object assignment determiner 210 may extract mobile object 600 corresponding to the activity demand of the user.

If the at least one mobile object 600 corresponding to the activity demand of the user is found as a result of the extraction in Step S335 (Step S335: Yes), mobile object assignment determiner 210 determines the at least one mobile object 600 found corresponding to the activity demand of the user as the mobile object candidate that is to be recommended to the user. Then, mobile object assignment determiner 210 generates mobile object recommendation information to recommend the determined mobile object candidate to the user (Step S337). Following this, mobile object assignment determiner 210 transmits the generated mobile object recommendation information to user peripheral terminal 500 (Step S340). In the present example, the mobile object recommendation information includes a mobile object ID that identifies the mobile object candidate, a geographical location of the mobile object candidate, an operation schedule of the mobile object candidate, an operation route of the mobile object candidate, information indicating details of a service that can be provided by the mobile object candidate, and information indicating a usage status of the mobile object candidate.

If the mobile object recommendation information is transmitted, user peripheral terminal 500 receives the transmitted mobile object recommendation information and presents the received mobile object recommendation information to the user (Step S350).

The first mobile object recommendation processing ends: if no available mobile object 600 is found in the vicinity of the location of the user in Step S325 (Step S325: No); if no mobile object 600 corresponding to the activity demand of the user is found in Step S335 (Step S335: No); or when Step S350 ends.

Next, the second mobile object recommendation processing is described with reference to the drawing.

As with the first mobile object recommendation processing, the second mobile object recommendation processing is performed to determine a mobile object candidate that is to be recommended to the user and then recommend the determined mobile object candidate to the user.

Figure 12:
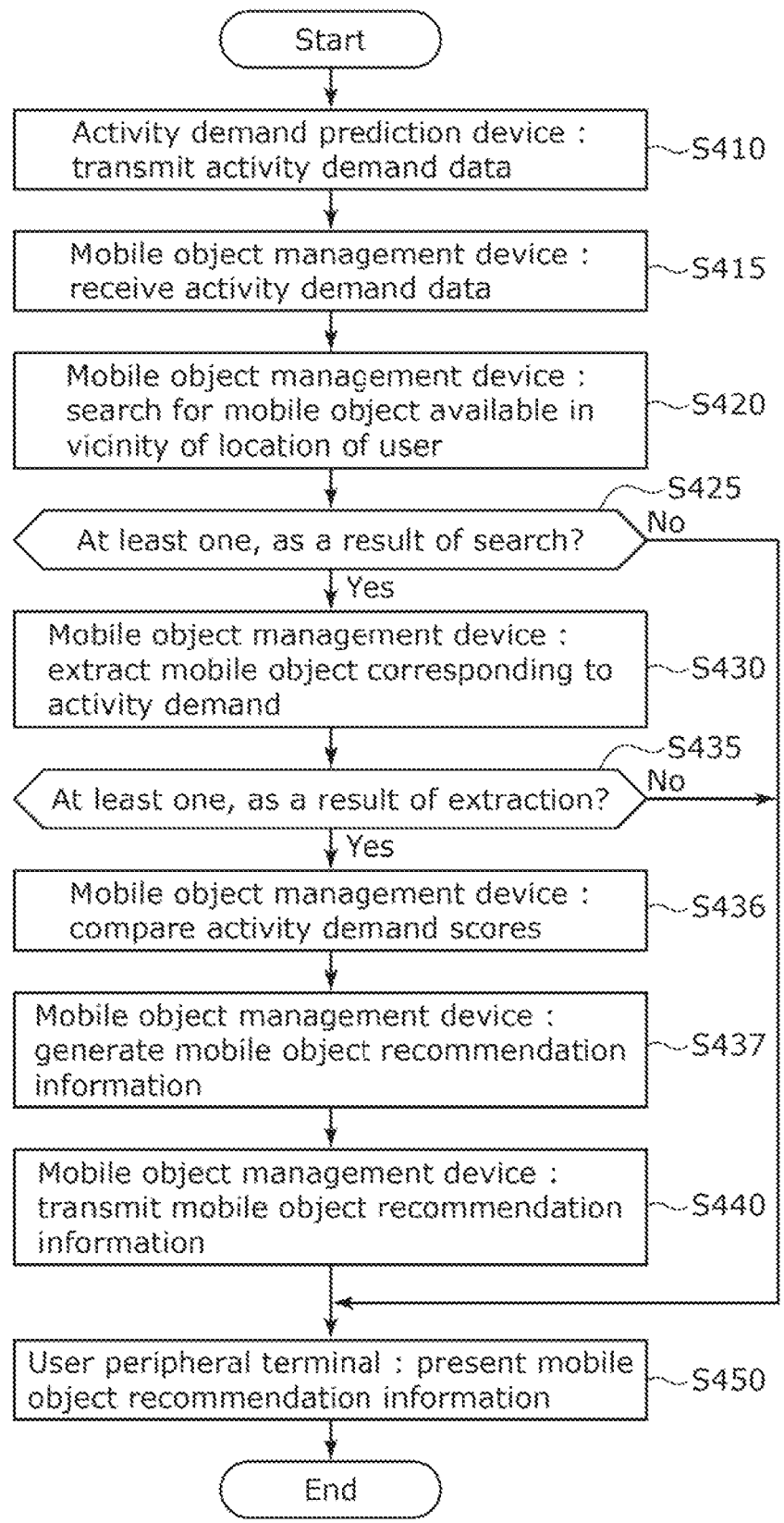
FIG. 12 is a flowchart of second mobile object recommendation processing according to Embodiment 1.

FIG. 12 is a flowchart of the second mobile object recommendation processing.

Steps S415 to S425, Step S435, and Steps S440 to S450 in FIG. 12 are the same as Steps S315 to S325, Step S335, and Steps S340 to S350 of the first mobile object recommendation processing (see FIG. 11). Assuming that Steps S415 to S425, Step S435, and Steps S440 to S450 have already been described, detailed description on these steps is omitted. Thus, Steps S410, S430, S436, and S437 are mainly described below.

In the second mobile object recommendation processing, activity demand predictor 140 generates activity demand data indicating the predicted activity demand. For example, activity demand predictor 140 may predict the activity demand through the execution of the activity demand prediction processing described above. In the present example, the activity demand data includes a user ID that identifies the user, a date and time, a geographical location of the user, a plurality of activity demands, and a plurality of activity demand scores corresponding to the plurality of activity demands.

Activity demand predictor 140 generates the activity demand data and transmits the generated activity demand data to mobile object management device 200 (Step S410). Then, activity demand predictor 140 proceeds to Step S415.

If the at least one available mobile object 600 is found in the vicinity of the location of the user in Step S425 (Step S425: Yes), mobile object assignment determiner 210 extracts mobile object 600 corresponding to the activity demand of the user from among the at least one available mobile object 600 found in the vicinity of the location of the user (Step S430). For example, mobile object assignment determiner 210 may extract mobile objects 600 corresponding to the activity demands in descending order of activity demand score, from among the at least one available mobile object 600 found in the vicinity of the location of the user. For example, mobile object assignment determiner 210 may extract only a predetermined number of mobile objects 600 corresponding to activity demands in descending order of activity demand score. For example, mobile object assignment determiner 210 may extract mobile objects 600 in ascending order of distance from the location of the user. For example, mobile object assignment determiner 210 may extract only a predetermined number of mobile objects 600 in ascending order of distance from the location of the user. Then, mobile object assignment determiner 210 proceeds to Step S435.

If the at least one mobile object 600 corresponding to the activity demand of the user is found in Step S435 (Step S435: Yes), mobile object assignment determiner 210 compares the activity demand scores of the activity demands corresponding to the at least one mobile object 600 found (Step S436). Mobile object assignment determiner 210 determines mobile object 600 corresponding to the highest activity demand score as the mobile object candidate that is to be recommended to the user. Then, mobile object assignment determiner 210 generates the mobile object recommendation information to recommend the determined mobile object candidate to the user (S437). Here, if a plurality of activity demands correspond to the highest activity demand score, mobile object assignment determiner 210 may determine the mobile object candidate according to a predetermined order of priority of activity demand. For example, instead of determining mobile object 600 corresponding to the highest activity demand score as the mobile object candidate that is to be recommended to the user, mobile object assignment determiner 210 may determine a predetermined number of mobile objects 600 in descending order of activity demand score as the mobile object candidates that are to be recommended to the user. Then, mobile object assignment determiner 210 proceeds to Step S440.

Next, the first request-response processing is described with reference to the drawing.

In the first request-response processing, mobile object management device 200, service management device 300, or facility data management device 400 requests an activity demand of a user by transmitting a user ID that identifies this user to activity demand prediction device 100, which then responds to this request.

Figure 13:
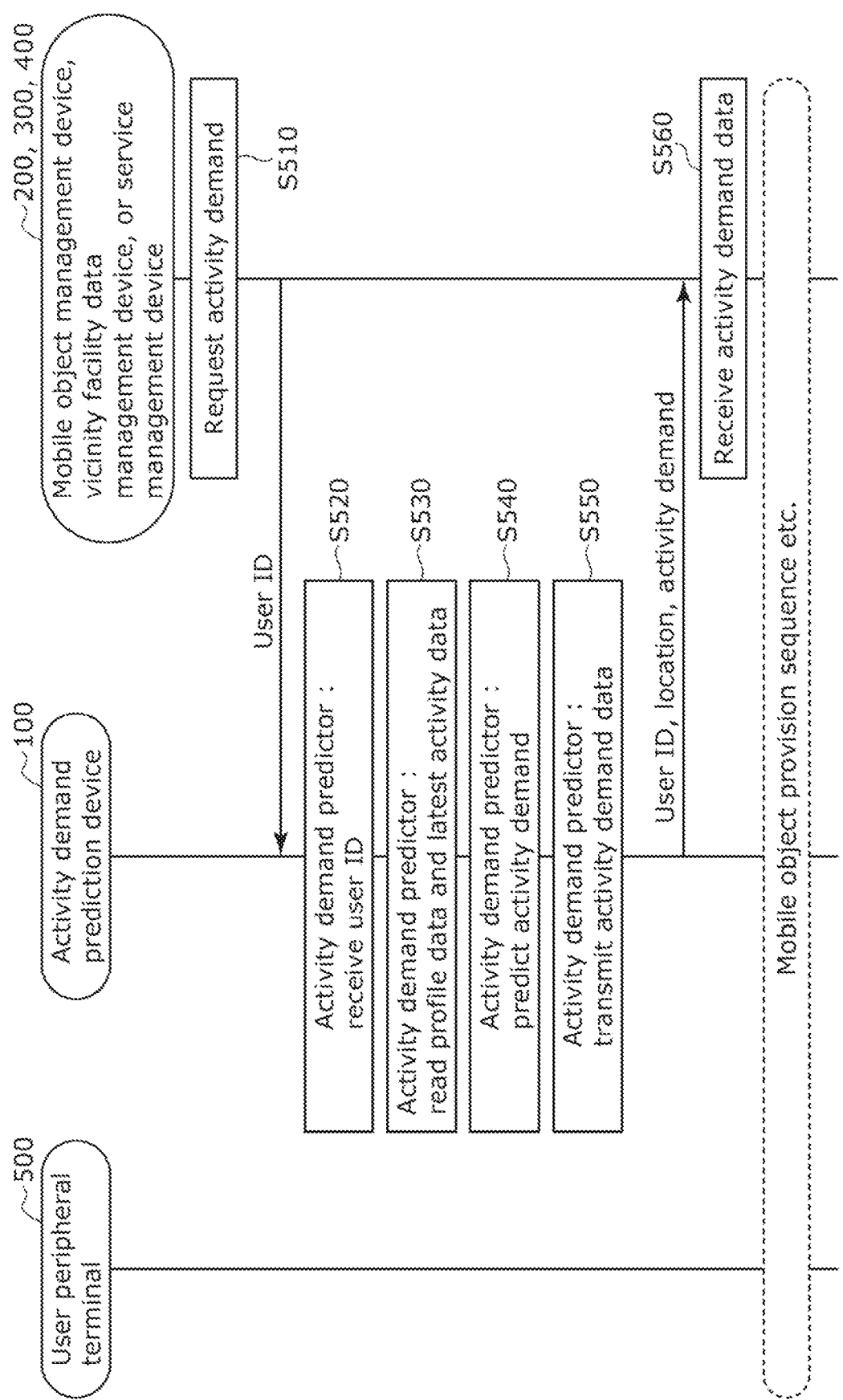
FIG. 13 is a sequence of first request-response processing according to Embodiment 1.

FIG. 13 is a sequence of the first request-response processing.

In the first request-response processing, mobile object management device 200, service management device 300, or facility data management device 400 requests an activity demand of a user by transmitting a user ID that identifies this user to activity demand prediction device 100 (Step S510).

If the user ID is transmitted, activity demand predictor 140 receives the transmitted user ID (Step S520).

If receiving the user ID, activity demand predictor 140 reads profile data of the user identified by the received user ID and latest activity data (that is, newest activity data) of the user, from data accumulator 120 (Step S530). In accordance with the read profile data and the read latest activity data, activity demand predictor 140 predicts an activity demand at a latest activity time point of the user identified by the received user ID (Step S540). Then, activity demand predictor 140 generates activity demand data indicating the predicted activity demand. In the present example, the activity demand data includes the received user ID, a geographical location of the user that is identified by the latest activity data, and the predicted activity demand.

After generating the activity demand data, activity demand predictor 140 transmits the generated activity demand data, as a response to the request, to the device (mobile object management device 200, service management device 300, or facility data management device 400) that is a transmission source of the user ID (Step S550).

If the activity demand data is transmitted, the device (mobile object management device 200, service management device 300, or facility data management device 400) that is the transmission source of the user ID receives the transmitted activity demand data (Step S560).

Next, the second request-response processing is described with reference to the drawing.

In the second request-response processing, mobile object management device 200, service management device 300, or facility data management device 400 transmits, to activity demand prediction device 100, a service ID that identifies a service enabled by mobile object 600 or location information indicating a geographical location of the user. By this transmission, mobile object management device 200, service management device 300, or facility data management device 400 requests the service or an activity demand of the user corresponding to the location. Then, activity demand prediction device 100 responds to this request in the second request-response processing.

Figure 14:
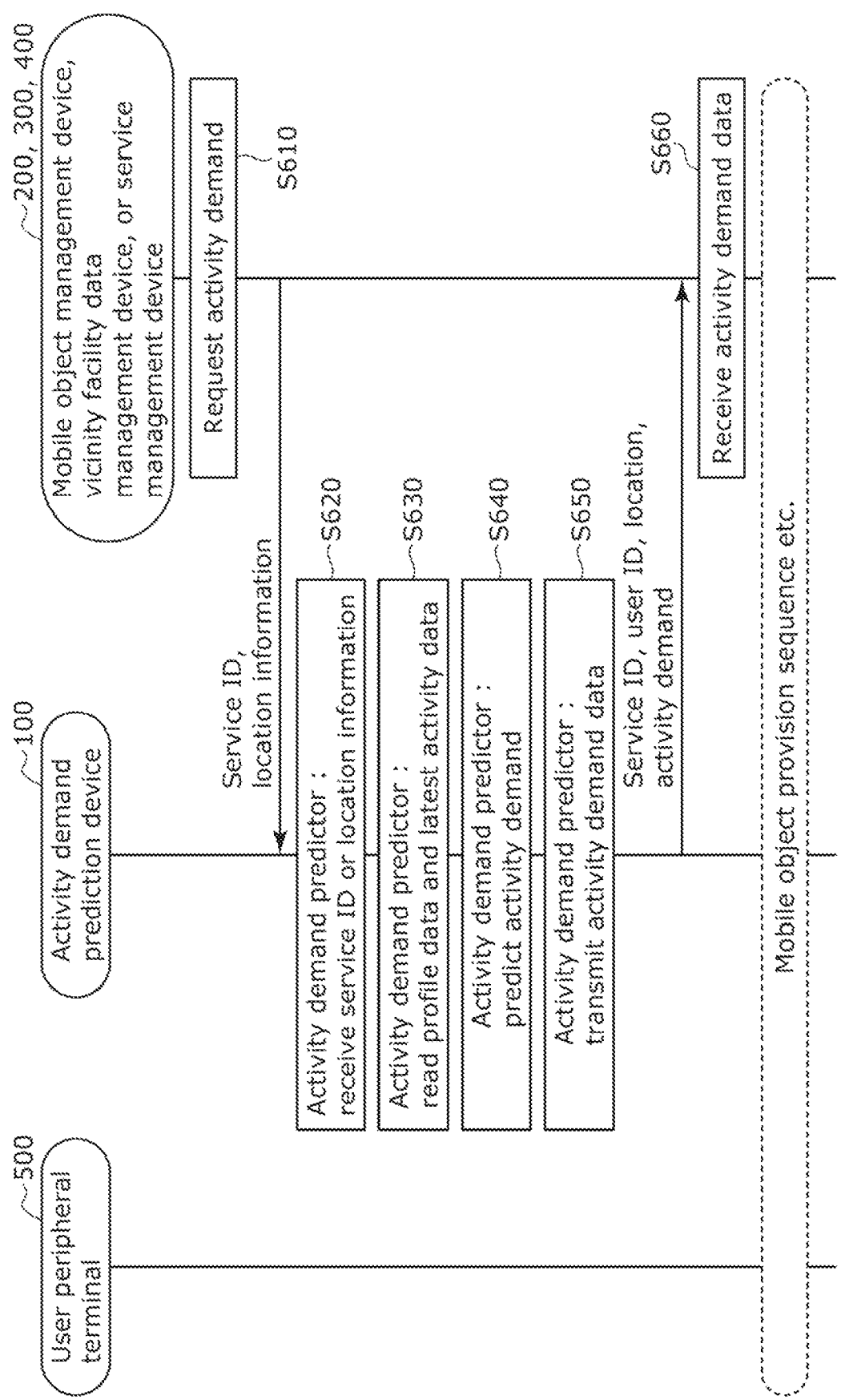
FIG. 14 is a sequence of second request-response processing according to Embodiment 1.

FIG. 14 is a sequence of the second request-response processing.

In the second request-response processing, mobile object management device 200, service management device 300, or facility data management device 400 requests an activity demand of the user by transmitting a service ID that identifies a service enabled by mobile object 600 or location information indicating a geographical location of the user (Step S610).

If the service ID or the location information is transmitted, activity demand predictor 140 receives the transmitted service ID or the transmitted location information (Step S620).

If receiving the service ID or the location information, activity demand predictor identifies the user corresponding to the received service ID or the received location information. Then, activity demand predictor 140 reads profile data of the identified user and latest activity data (that is, newest activity data) of this user, from data accumulator 120 (Step S630). In accordance with the read profile data and the read latest activity data, activity demand predictor 140 predicts an activity demand of the user that corresponds to the received service ID or the received location information (Step S640). Then, activity demand predictor 140 generates activity demand data indicating the predicted activity demand. In the present example, the activity demand data includes the received service ID or the received location information, the user ID of the identified user, the geographical location of the user that is identified by the latest activity data, and the predicted activity demand.

After generating the activity demand data, activity demand predictor 140 transmits the generated activity demand data, as a response to the request, to the device (mobile object management device 200, service management device 300, or facility data management device 400) that is a transmission source of the user ID (Step S650).

If the activity demand data is transmitted, the device (mobile object management device 200, service management device 300, or facility data management device 400) that is the transmission source of the user ID receives the transmitted activity demand data (Step S660).

Next, the third request-response processing is described with reference to the drawing.

In the third request-response processing, mobile object management device 200, service management device 300, or facility data management device 400 transmits, to activity demand prediction device 100, an activity demand ID that identifies activity demand data and location information indicating a geographical location of the user. By this transmission, mobile object management device 200, service management device 300, or facility data management device 400 requests the activity demand data and a user ID that identifies the user corresponding to the location. Then, activity demand prediction device 100 responds to this request in the third request-response processing.

Figure 15:
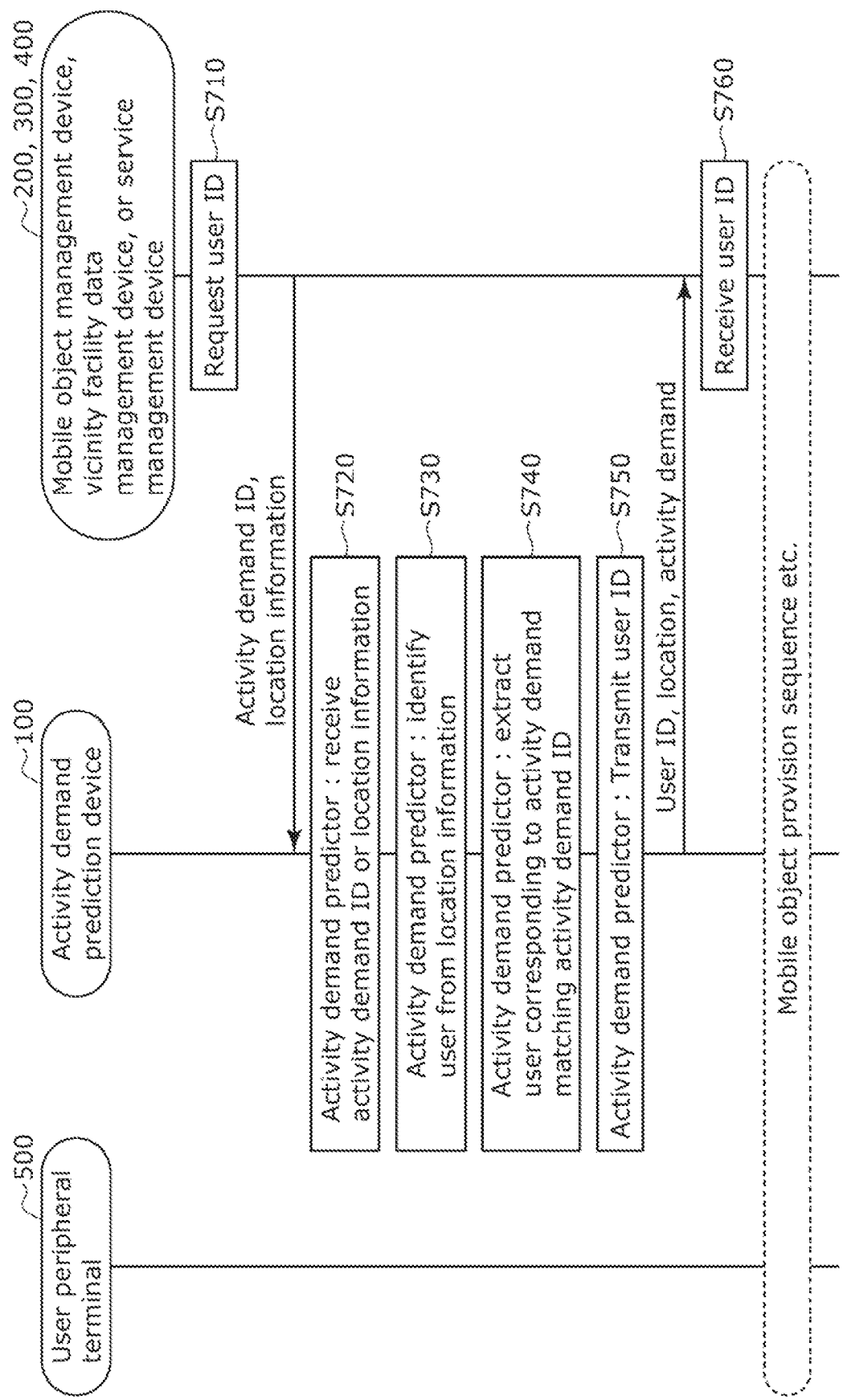
FIG. 15 is a sequence of third request-response processing according to Embodiment 1.

FIG. 15 is a sequence of the third request-response processing.

In the third request-response processing, mobile object management device 200, service management device 300, or facility data management device 400 transmits, to activity demand prediction device 100, an activity demand ID that identifies activity demand data and location information indicating a geographical location of the user. By this transmission, mobile object management device 200, service management device 300, or facility data management device 400 requests the activity demand data and the user ID that identifies the user corresponding to the location (Step S710).

If the activity demand ID and the location information are transmitted, activity demand predictor 140 receives the transmitted activity demand ID and the transmitted location information (Step S720).

If receiving the activity demand ID and the location information, activity demand predictor 140 identifies the user corresponding to the location information by reference to the latest activity data for each user stored in data accumulator 120 (Step S730). Activity demand predictor 140 determines for each identified user whether the activity demand data identified by the received activity demand ID matches the activity demand data previously generated. Then, activity demand predictor 140 extracts the user corresponding to the activity demand data that is determined as matching the activity demand data previously generated (Step S740). Following this, activity demand predictor 140 generates a user ID that identifies the extracted user.

After generating the user ID, activity demand predictor 140 transmits the generated user ID, as a response to the request, to the device (mobile object management device 200, service management device 300, or facility data management device 400) that is a transmission source of the activity demand ID and the location information (Step S750).

If the user ID is transmitted, the device (mobile object management device 200, service management device 300, or facility data management device 400) that is the transmission source of the activity demand ID and the location information receives the transmitted user ID (Step S760).

Next, the mobile object provision processing is described with reference to the drawings.

The mobile object provision processing is performed to receive an order for mobile object 600 from the user and then provide mobile object 600 to the user.

Figure 16:
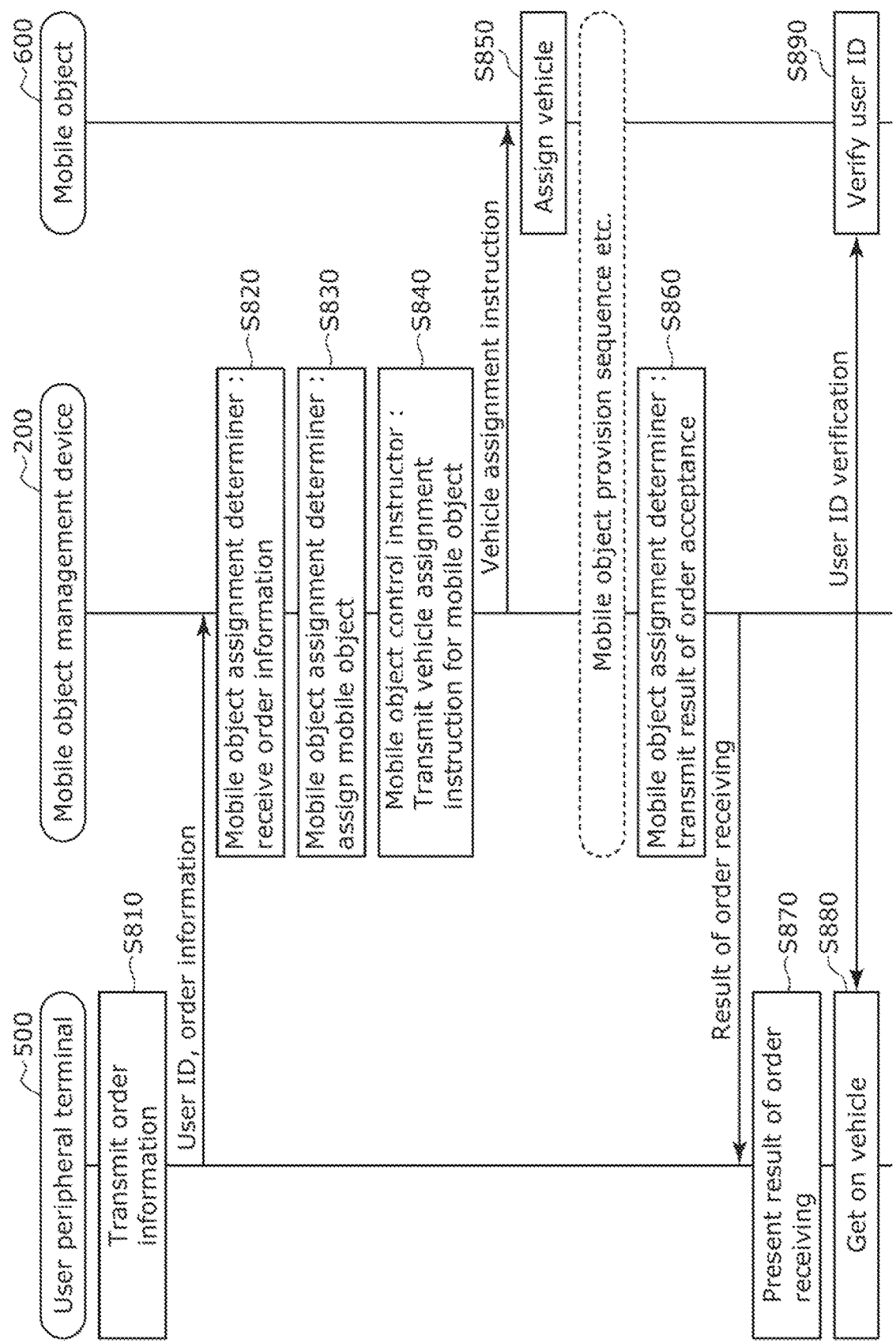
FIG. 16 is a sequence of mobile object provision processing according to Embodiment 1.
Figure 17:
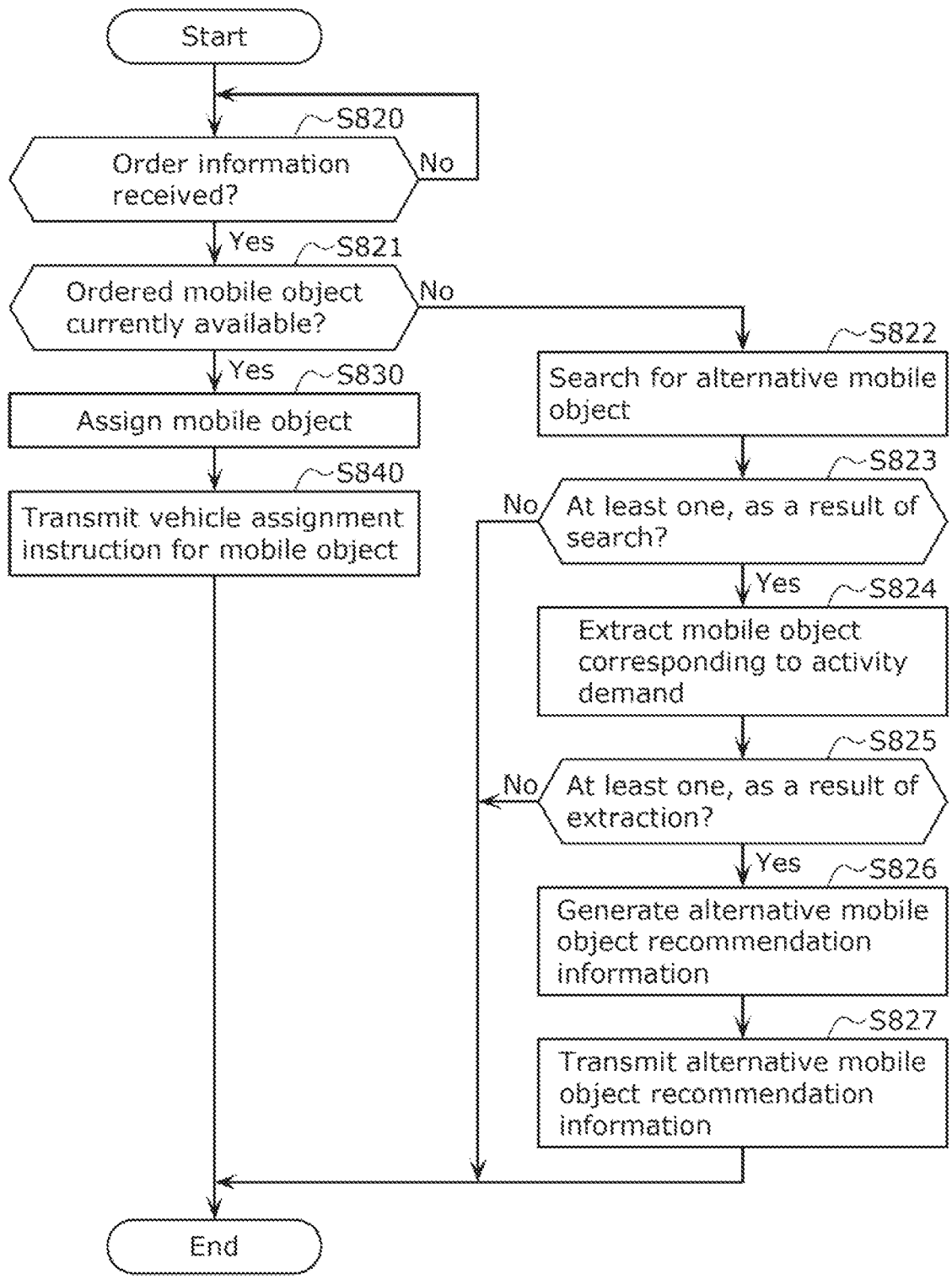
FIG. 17 is a flowchart of a part of processing performed by the activity demand prediction device in the mobile object provision processing according to Embodiment 1.

FIG. 16 is a sequence of the mobile object provision processing. FIG. 17 is a flowchart of a part of processing performed by activity demand prediction device 100 in the mobile object provision processing.

In the mobile object provision processing, user peripheral terminal 500 receives an order for mobile object 600 from the user. For example, user peripheral terminal 500 may include a touch panel and receive the order for mobile object 600 by receiving an operation performed by the user on the touch panel. If receiving the order for mobile object 600, user peripheral terminal 500 generates order information indicating details of the received order. Then, user peripheral terminal 500 transmits, to activity demand prediction device 100, the generated order information and the user ID that identifies the user who makes this order (Step S810). In the present example, the order for mobile object 600 made by the user includes an activity demand of the user. Moreover, the order information generated by user peripheral terminal 500 includes the activity demand of the user.

If the order information and the user ID are transmitted, mobile object assignment determiner 210 receives the transmitted order information and the transmitted user ID (Step S820 in FIG. 16) (Step S820: Yes after No is repeated, in FIG. 17).

If receiving the order information and the user ID, mobile object state manager 220 checks whether mobile object 600 ordered is currently available (Step S821).

If it is checked in Step S821 that mobile object 600 ordered is currently available (Step S821: Yes), mobile object assignment determiner 210 determines the mobile object 600 ordered as an assigned mobile object to be assigned to the user identified by the received user ID (Step S830). Thus, mobile object assignment determiner 210 receives the order for mobile object 600 from the user. Then, mobile object assignment determiner 210 transmits a vehicle assignment instruction to mobile object 600 determined as the assigned mobile object (Step S840).

If receiving the vehicle assignment instruction, mobile object 600 determined as the assigned mobile object receives the transmitted vehicle assignment instruction. Then, mobile object 600 is provided to the user identified by the user ID according to the received vehicle assignment instruction (Step S850).

On the other hand, mobile object assignment determiner 210 transmits, to user peripheral terminal 500, a result of the order receiving indicating that the order is received (Step S860).

If the result of the order receiving is transmitted, user peripheral terminal 500 receives the result of the order receiving and presents the received result of the order receiving to the user (Step S870). After this, mobile object 600 that is the assigned mobile object is provided and then the user rides in mobile object 600 provided (Step S880).

Then, mobile object 600 provided verifies the user ID by checking the user riding in mobile object 600 against the user ID (Step S890).

If it is checked in Step S821 that mobile object 600 ordered is currently unavailable (Step S821: No), mobile object state manager 220 searches for an alternative mobile object (Step S822). For example, mobile object state manager 220 may search for different mobile object 600 that is currently available, as the alternative mobile object.

If at least one alternative mobile object is found in Step S822 (Step S823: Yes), mobile object assignment determiner 210 extracts mobile object 600 corresponding to the activity demand of the user from among the at least one alternative mobile object found (Step S824). Then, mobile object assignment determiner 210 checks whether mobile object 600 corresponding to the activity demand of the user is found as a result of the extraction (Step S825). Here, mobile object assignment determiner 210 may previously store a correspondence list between an activity demand and mobile object 600. Using this correspondence list, mobile object assignment determiner 210 may extract mobile object 600 corresponding to the activity demand of the user.

If the at least one mobile object 600 corresponding to the activity demand of the user is found in Step S825 (Step S825: Yes), mobile object assignment determiner 210 determines the at least one mobile object 600 found corresponding to the activity demand of the user as an alternative mobile object that is to be recommended to the user. Then, mobile object assignment determiner 210 generates alternative mobile object recommendation information to recommend the determined alternative mobile object to the user (Step S826). Following this, mobile object assignment determiner 210 transmits the generated alternative mobile object recommendation information to user peripheral terminal 500 (Step S827).

Mobile object assignment determiner 210 does not transmit the alternative mobile object recommendation information to user peripheral terminal 500: if no alternative mobile object is found in Step S823 (Step S823: No); or if no mobile object 600 corresponding to the activity demand of the user is found in Step S825 (Step S825: No).

Next, the third mobile object recommendation processing is described with reference to the drawings.

The third mobile object recommendation processing is performed to determine a mobile object candidate that is to be recommended to the user or a facility candidate that is to be recommended to the user, and then recommend the determined mobile object candidate or the determined facility candidate to the user.

Figure 18:
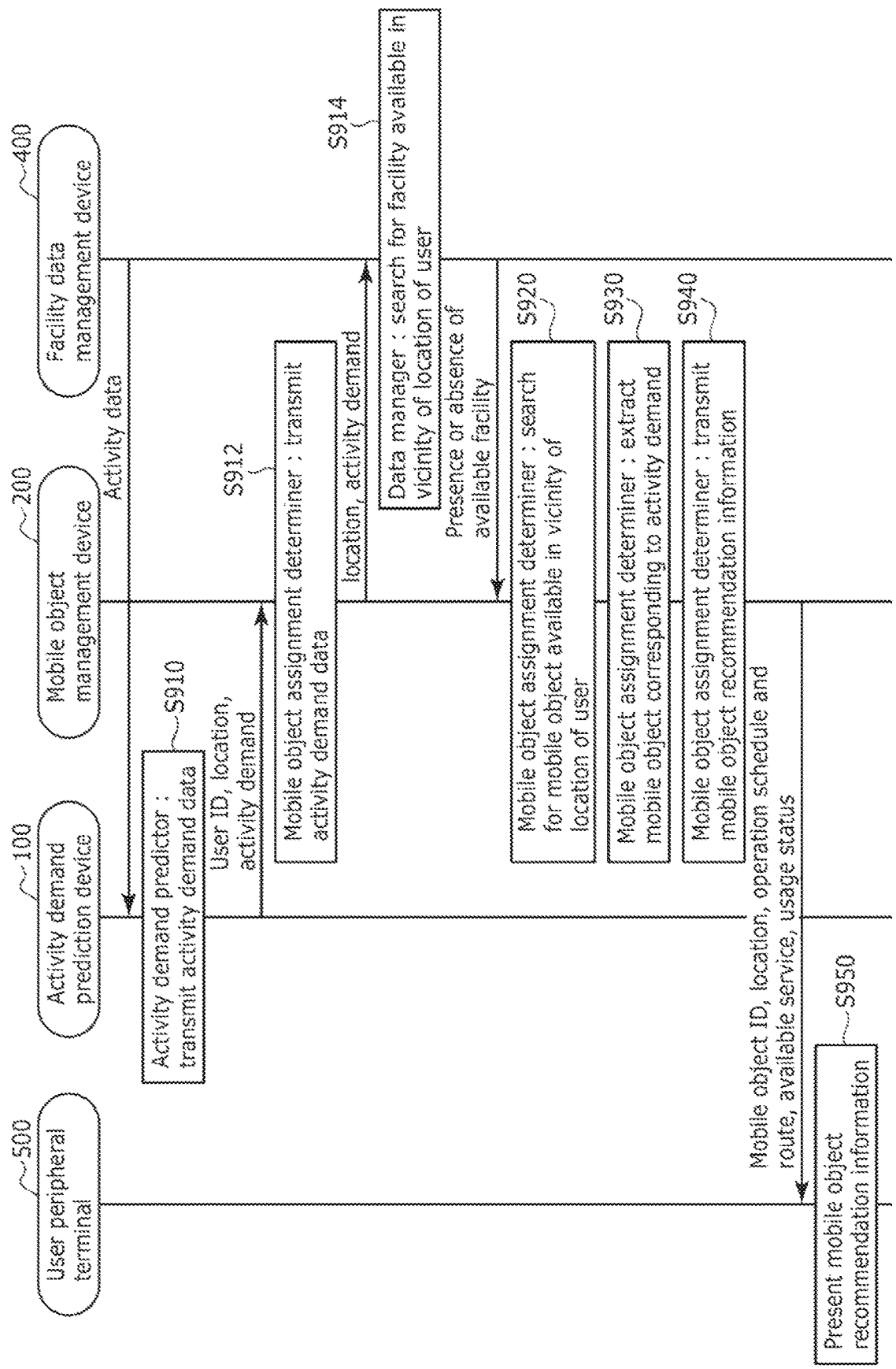
FIG. 18 is a sequence of third mobile object recommendation processing according to Embodiment 1.
Figure 19:
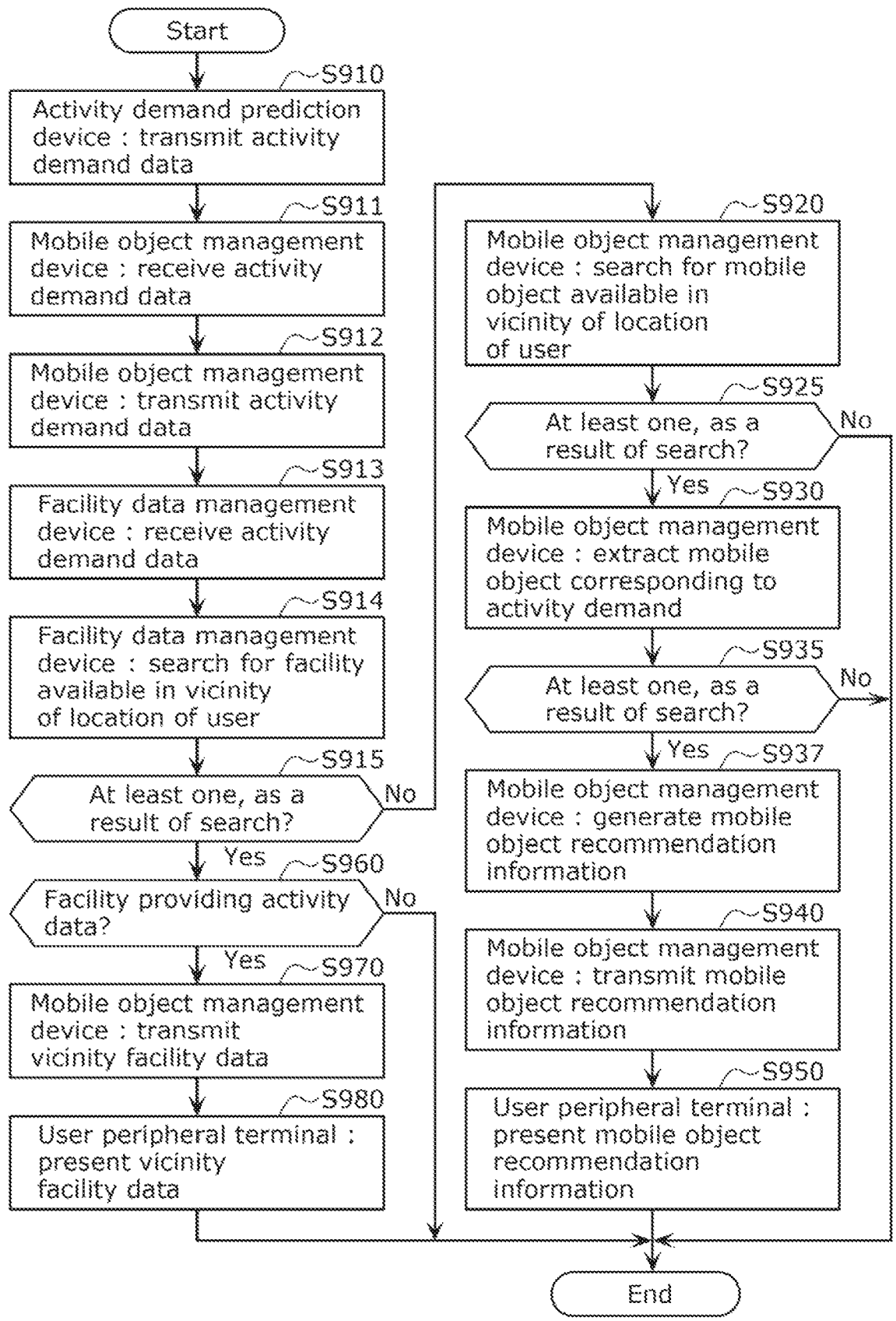
FIG. 19 is a flowchart of the third mobile object recommendation processing according to Embodiment 1.

FIG. 18 is a sequence of the third mobile object recommendation processing. FIG. 19 is a flowchart of the third mobile object recommendation processing Steps S920 to S950 in FIG. 18 and FIG. 19 are the same as Steps S320 to Step S350 of the first mobile object recommendation processing (see FIG. 10 and FIG. 11). Assuming that Steps S920 to S950 have already been described, detailed description on these steps is omitted. Thus, Step S910 to Step S915 and Steps S960 to Step S980 are mainly described below.

In the third mobile object recommendation processing, facility data management device 400 receives activity data indicating an activity of the user in a facility from at least one facility and then stores the received activity data. Then, facility data management device 400 transmits the stored activity data to activity demand prediction device 100.

In the third mobile object recommendation processing, activity demand predictor 140 generates activity demand data indicating the activity demand predicted in accordance with the activity data transmitted from facility data management device 400. For example, activity demand predictor 140 may predict the activity demand through the execution of the activity demand prediction processing described above. In the present example, the activity demand data includes a user ID that identifies the user, a date and time, a geographical location of the user, and at least one activity demand.

After generating the activity demand data, activity demand predictor 140 transmits the generated activity demand data to mobile object management device 200 (Step S910).

If the activity demand data is transmitted, mobile object assignment determiner 210 receives the transmitted activity demand data (S911). Then, mobile object assignment determiner 210 transmits the received activity demand data to facility data management device 400 (Step S912). Here, mobile object assignment determiner 210 may delete the user ID from the received activity demand data, generate new activity demand data, and transmit the generated new activity demand data to facility data management device 400.

If the activity demand data is transmitted, data manager 410 receives the transmitted activity demand data (Step S913). In accordance with the activity demand and the geographical location of the user that are included in the received activity demand data, data manager 410 searches for a facility available in the vicinity of the location of the user by reference to the facility data stored in data accumulator 420 (Step S914). Then, data manager 410 transmits, to mobile object management device 200, search result information indicating whether an available facility is found.

If the search result information is transmitted, mobile object assignment determiner 210 receives the transmitted search result information. Then, mobile object assignment determiner 210 checks whether the received search result information indicates that at least one available facility is found in the vicinity of the location of the user (Step S915).

If the received search result information indicates that no available facility is found in the vicinity of the location of the user in Step S915 (Step S915: No), mobile object assignment determiner 210 proceeds to Step S920.

If the received search result information indicates that at least one available facility is found in the vicinity of the location of the user in Step S915 (Step S915: Yes), mobile object assignment determiner 210 checks whether the at least one facility includes a facility that provides activity data to facility data management device 400 (Step S960).

If it is checked in Step S960 that the facility providing the activity data is included (Step S960: Yes), mobile object assignment determiner 210 determines each facility that provides the activity data as a facility candidate that is to be recommended to the user. Then, mobile object assignment determiner 210 generates vicinity facility data indicating each determined facility candidate, and then transmits the generated vicinity facility data to user peripheral terminal 500 (Step S970).

If the vicinity facility data is transmitted, user peripheral terminal 500 receives the transmitted vicinity facility data and presents the received vicinity facility data to the user (Step S980).

The third mobile object recommendation processing ends: if no available mobile object 600 is found in the vicinity of the location of the user in Step S925 (Step S925: No); if no mobile object 600 corresponding to the activity demand of the user is found in Step S935 (Step S935: No); when Step S950 ends; if it is checked in Step S960 that no facility that provides the activity data is found (Step S960: No); or when Step S980 ends.

Note that even if an available vicinity facility is found, a mobile object may be recommended if a predetermined condition is satisfied. To be more specific, if it is checked as "Yes" in Step S915 or S960 but a mobile object that has an advantage over the found vicinity facility exists, this mobile object is recommended. For example, if a usage fee of a mobile object is lower than that of the vicinity facility, this mobile object is recommended. Here, the presence or absence of an advantage may be determined in accordance with the profile data of the user. For example, if the user has difficulty walking or is an elderly person, a mobile object may be recommended. Moreover, if a mobile object is located closer to the user than the vicinity facility or if the mobile object is to pick up the user, this mobile object may be recommended.

Next, the first mobile object group recommendation processing is described with reference to the drawings.

The first mobile object recommendation processing is performed to determine a mobile object group candidate including a plurality of mobile object candidates that are to be recommended to the user and then recommend the determined mobile object group candidate. Here, the mobile object group refers to a group of a plurality of mobile objects parked close to each other.

For example, the mobile object group may be a group of mobile objects 600 that are a plurality of mobile boutiques each selling a different brand. In this case, this mobile object group is capable of satisfying an activity demand to go to a fashionable store or to shop, for example.

For example, the mobile object group may be a group of mobile objects 600 that are a plurality of fitness facilities, such as a mobile yoga class and a mobile gym, in which the user can do physical exercise. In this case, this mobile object group is capable of satisfying an activity demand to exercise.

Figure 20:
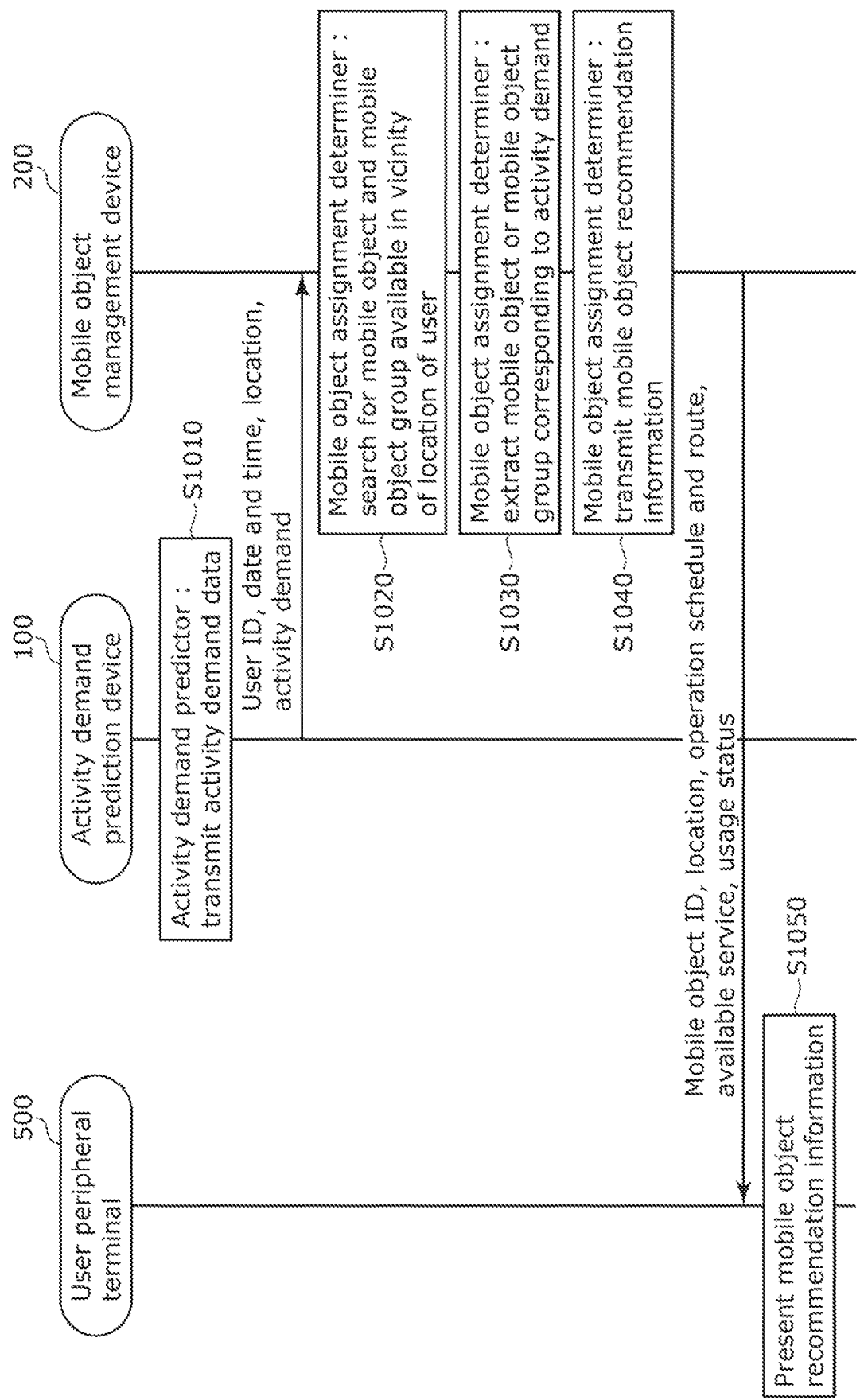
FIG. 20 is a sequence of first mobile object group recommendation processing according to Embodiment 1.
Figure 21:
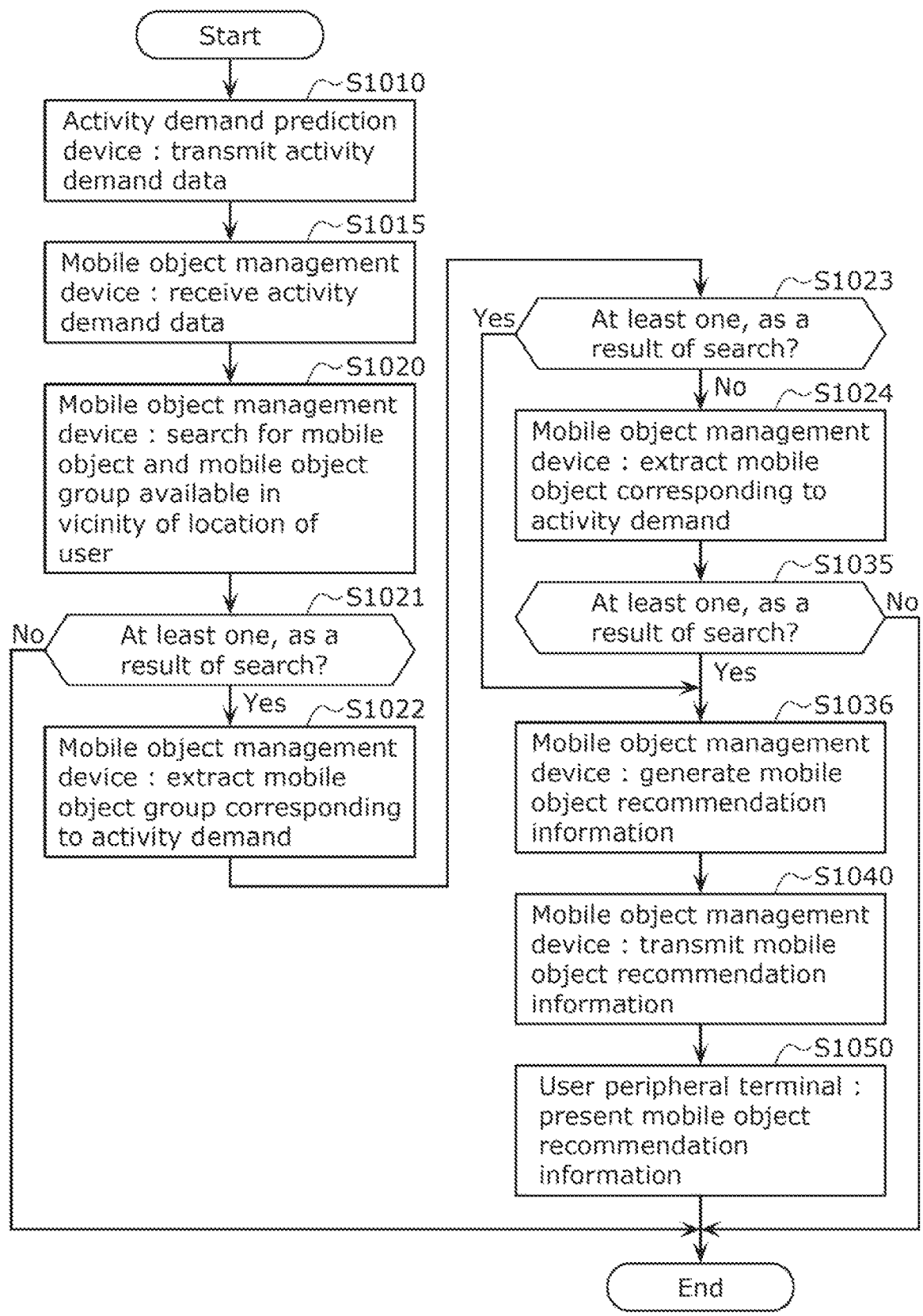
FIG. 21 is a flowchart of the first mobile object group recommendation processing according to Embodiment 1.

FIG. 20 is a sequence of the first mobile object group recommendation processing. FIG. 21 is a flowchart of the first mobile object group recommendation processing.

Steps S1010 to S1015 in FIG. 20 and FIG. 21 are the same as Steps S310 to S315 of the first mobile object recommendation processing (see FIG. 10 and FIG. 11). Assuming that Steps S1010 to S1015 have already been described, detailed description on these steps is omitted. Thus, Steps S1020 to S1050 are mainly described below.

If receiving the activity demand data in Step S1015, mobile object assignment determiner 210 searches for mobile object 600 and a mobile object group available in the vicinity of the location of the user in accordance with the received activity demand data (Step S1020). Then, mobile object assignment determiner 210 checks whether at least one available mobile object 600 or at least one mobile object group is found in the vicinity of the location of the user as a result of the search (Step S1021).

If the at least one available mobile object 600 or the at least one mobile object group is found in the vicinity of the location of the user in Step S1021 (Step S1021: Yes), mobile object assignment determiner 210 extracts a mobile object group corresponding to the activity demand of the user from among the at least one available mobile object 600 or the at least one mobile object group found in the vicinity of the location of the user (Step S1022). Then, mobile object assignment determiner 210 checks whether at least one mobile object group corresponding to the activity demand of the user is found as a result of the extraction (Step S1023). Here, mobile object assignment determiner 210 may previously store a correspondence list between an activity demand and a mobile object group. Using this correspondence list, mobile object assignment determiner 210 may extract the mobile object group corresponding to the activity demand of the user.

If no mobile object group corresponding to the activity demand of the user is found in Step S1023 (Step S1023: No), mobile object assignment determiner 210 extracts mobile object 600 corresponding to the activity demand of the user from among the at least one available mobile object 600 found in the vicinity of the location of the user as a result of "Yes" in Step S1021 (Step S1024). Then, mobile object assignment determiner 210 checks whether at least one mobile object 600 corresponding to the activity demand of the user is found as a result of the extraction (Step S1035). Here, mobile object assignment determiner 210 may previously store a correspondence list between an activity demand and mobile object 600. Using this correspondence list, mobile object assignment determiner 210 may extract mobile object 600 corresponding to the activity demand of the user.

If the at least one mobile object group corresponding to the activity demand of the user is found in Step S1023 (Step S1023: Yes), mobile object assignment determiner 210 determines the at least one mobile object group as the mobile object group candidate that is to be recommended to the user. If the at least one mobile object 600 corresponding to the activity demand of the user is found in Step S1035 (Step S1035: Yes), mobile object assignment determiner 210 determines the at least one mobile object 600 as the mobile object candidate that is to be recommended to the user. Then, mobile object assignment determiner 210 generates mobile object recommendation information to recommend the determined mobile object group candidate or the determined mobile object candidate to the user (Step S1036). Following this, mobile object assignment determiner 210 transmits the generated mobile object recommendation information to user peripheral terminal 500 (Step S1040), In the present example, the mobile object recommendation information includes a mobile object ID that identifies the mobile object candidate or the mobile object group candidate, a geographical location of the mobile object candidate or the mobile object group candidate, an operation schedule of the mobile object candidate or the mobile object group candidate, an operation route of the mobile object candidate or the mobile object group candidate, information indicating details of a service that can be provided by the mobile object candidate or the mobile object group candidate, and information indicating a usage status of the mobile object candidate or the mobile object group candidate.

If the mobile object recommendation information is transmitted, user peripheral terminal 500 receives the transmitted mobile object recommendation information and presents the received mobile object recommendation information to the user (Step S1050).

The first mobile object group recommendation processing ends: if no available mobile object 600 is found in the vicinity of the location of the user in Step S1021 (Step S1021: No); if no mobile object 600 corresponding to the activity demand of the user is found in Step S1035 (Step S1035: No); or when Step S1050 ends.

If the at least one mobile object group corresponding to the activity demand of the user is found in Step S1023 (Step S1023: Yes), mobile object assignment determiner 210 checks whether mobile object 600 corresponding to the activity demand of the user is included in the plurality of mobile objects 600 in the found mobile object group. If such mobile object 600 is included, mobile object assignment determiner 210 may determine this mobile object 600 as the mobile object candidate instead of determining the mobile object group as the mobile object group candidate. Then, mobile object assignment determiner 210 may generate mobile object recommendation information to recommend the determined mobile object candidate to the user and proceed to Step S1040. If such mobile object 600 is not included, mobile object assignment determiner 210 may determine this mobile object group as the mobile object group candidate. Then, mobile object assignment determiner 210 may generate mobile object recommendation information to recommend the determined mobile object group candidate to the user and proceed to Step S1040.

Next, the second mobile object group recommendation processing is described with reference to the drawing.

As with the first mobile object group recommendation processing, the second mobile object group recommendation processing is performed to determine a mobile object group candidate including a plurality of mobile object candidates that are to be recommended to the user and then recommend the determined mobile object group candidate to the user.

Figure 22:
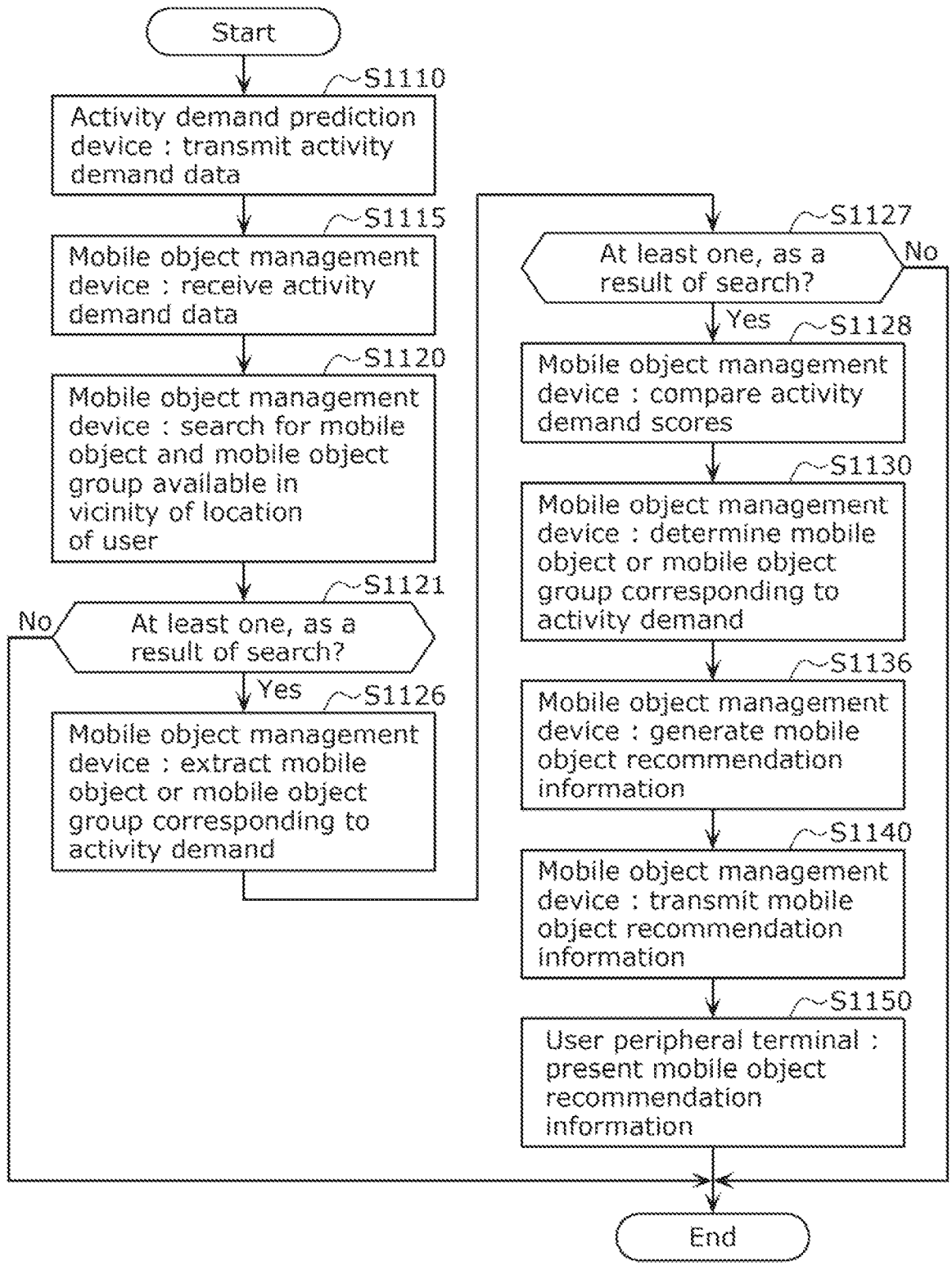
FIG. 22 is a flowchart of second mobile object group recommendation processing according to Embodiment 1.

FIG. 22 is a flowchart of the second mobile object group recommendation processing.

Steps S1115 to S1121 and Steps S1140 to S1150 in FIG. 22 are the same as Steps S1015 to S1021 and Steps S1040 to S1050 of the first mobile object group recommendation processing (see FIG. 21). Assuming that Steps S1115 to S1121 and Steps S1140 to S1150 have already been described, detailed description on these steps is omitted, Thus, Step S1110 and Steps S1126 to S1136 are mainly described below.

In the second mobile object group recommendation processing, activity demand predictor 140 generates activity demand data indicating the predicted activity demand. For example, activity demand predictor 140 may predict the activity demand through the execution of the activity demand prediction processing described above. In the present example, the activity demand data includes a user ID that identifies the user, a date and time, a geographical location of the user, a plurality of activity demands, and a plurality of activity demand scores corresponding to the plurality of activity demands.

After generating the activity demand data, activity demand predictor 140 transmits the generated activity demand data to mobile object management device 200 (Step S1110). Then, activity demand predictor 140 proceeds to Step S1115.

If the at least one available mobile object 600 or the at least mobile object group is found in the vicinity of the location of the user in Step S1121 (Step S1121: Yes), mobile object assignment determiner 210 extracts mobile object 600 or a mobile object group corresponding to the activity demand of the user from among the at least one available mobile object 600 or the at least one mobile object group found in the vicinity of the location of the user (Step S1126). For example, mobile object assignment determiner 210 may extract mobile objects 600 or mobile object groups corresponding to the activity demands in descending order of activity demand score, from among the at least one available mobile object 600 or the at least one mobile object group found in the vicinity of the location of the user. For example, mobile object assignment determiner 210 may extract only a predetermined number of mobile objects 600 or a predetermined number of mobile object groups corresponding to activity demands in descending order of activity demand score. For example, mobile object assignment determiner 210 may extract mobile objects 600 or mobile object groups in ascending order of distance from the location of the user. For example, mobile object assignment determiner 210 may extract only a predetermined number of mobile objects 600 or a predetermined number of mobile object groups in ascending order of distance from the location of the user. Then, mobile object assignment determiner 210 checks whether at least one mobile object 600 or at least one mobile object group corresponding to the activity demand of the user is found as a result of the extraction (Step S1127). Here, mobile object assignment determiner 210 may previously store a correspondence list between an activity demand and mobile object 600 and a correspondence list between an activity demand and a mobile object group. Using the correspondence list, mobile object assignment determiner 210 may extract the mobile object group corresponding to the activity demand of the user.

If the at least one mobile object 600 or the at least one mobile object group corresponding to the activity demand of the user is found in Step S1127 (Step S1127: Yes), mobile object assignment determiner 210 compares the activity demand scores of the activity demands corresponding to the at least one mobile object 600 or the at least one mobile object group found (Step S1128). Mobile object assignment determiner 210 determines mobile object 600 or a mobile object group corresponding to the highest activity demand score as the mobile object candidate or the mobile object group candidate that is to be recommended to the user (Step S1130). Then, mobile object assignment determiner 210 generates mobile object recommendation information to recommend the determined mobile object candidate or the determined mobile object group to the user (S1136). Here, if a plurality of activity demands correspond to the highest activity demand score, mobile object assignment determiner 210 may determine the mobile object candidate or the mobile object group candidate according to a predetermined order of priority of activity demand. For example, instead of determining the mobile object or the mobile object group corresponding to the highest activity demand score as the mobile object candidate or the mobile object group candidate that is to be recommended to the user, mobile object assignment determiner 210 may determine a predetermined number of mobile objects 600 or a predetermined number of mobile object groups in descending order of activity demand score as the mobile object candidates or mobile object group candidates that are to be recommended to the user. Then, mobile object assignment determiner 210 proceeds to Step S1140.

Next, the fourth mobile object recommendation processing is described with reference to the drawings.

Figure 23:
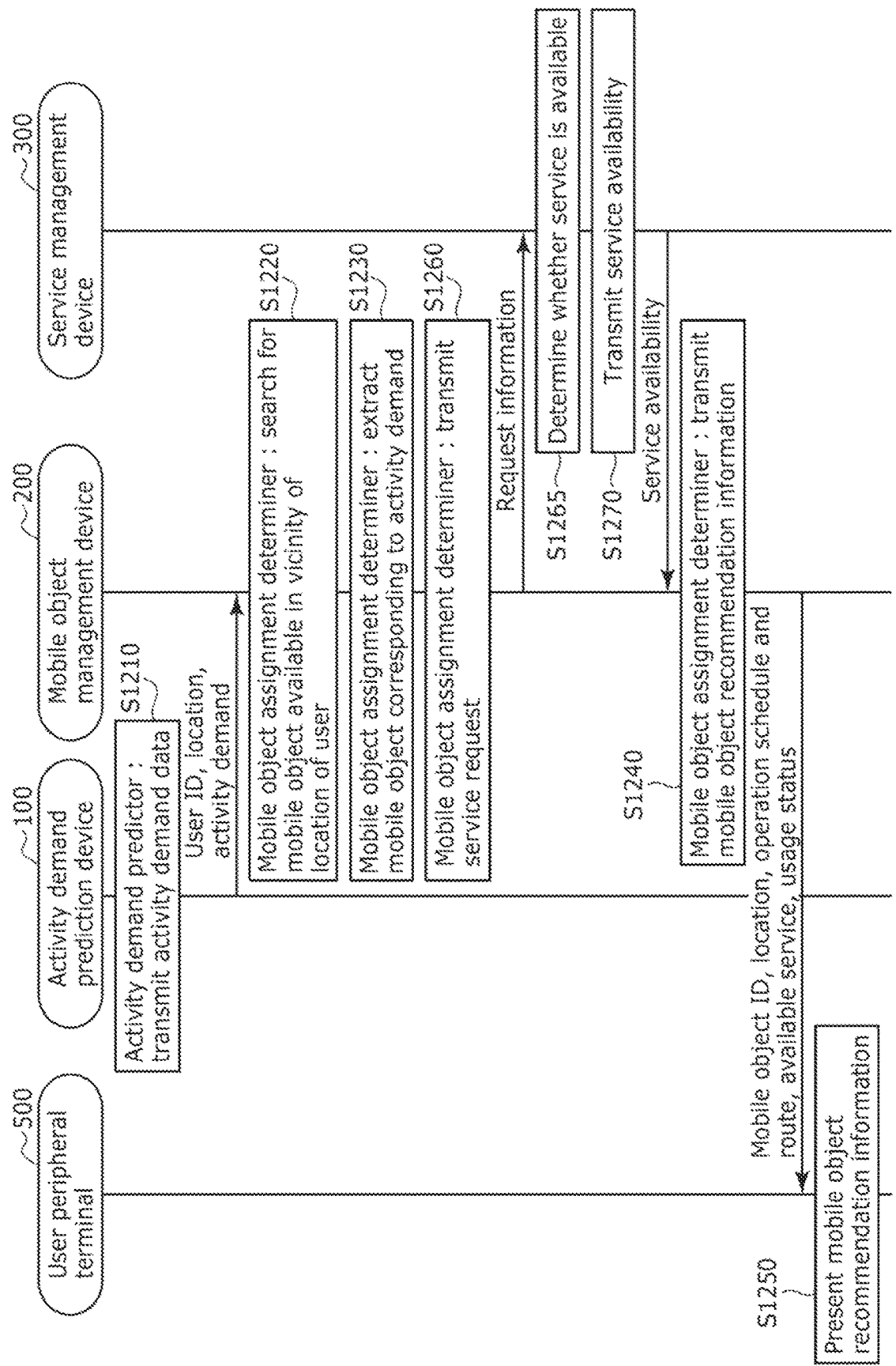
FIG. 23 is a sequence of fourth mobile object recommendation processing according to Embodiment 1.
Figure 24:
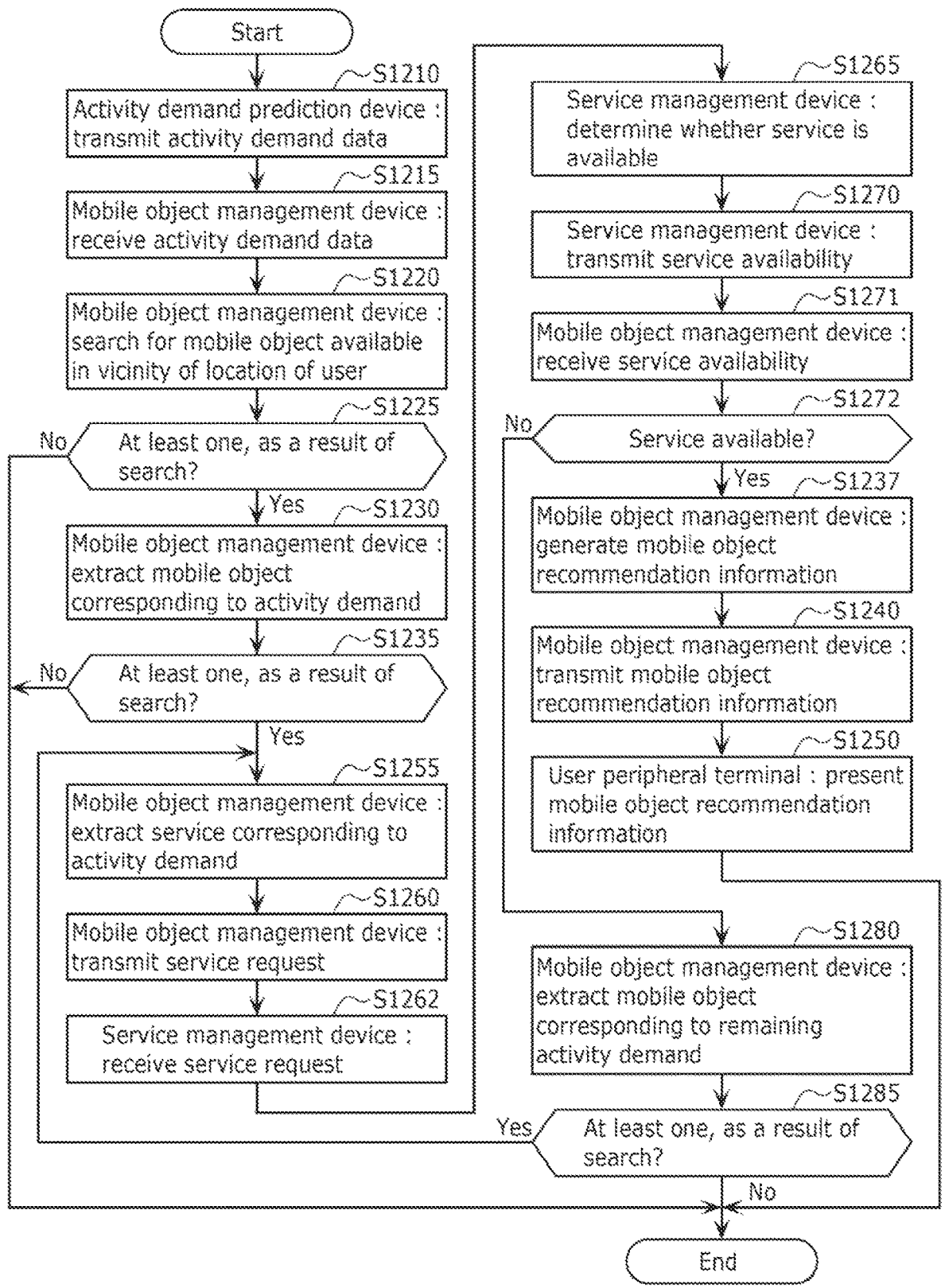
FIG. 24 is a flowchart of the fourth mobile object recommendation processing according to Embodiment 1.

As with the first mobile object recommendation processing, the fourth mobile object recommendation processing is performed to determine a mobile object candidate that is to be recommended to the user and then recommend the determined mobile object candidate to the user, FIG. 23 is a sequence of the fourth mobile object recommendation processing. FIG. 24 is a flowchart of the fourth mobile object recommendation processing.

Steps S1210 to S1235 and Steps S1240 to S1250 in FIG. 23 and FIG. 24 are the same as Steps S310 to S335 and Steps S340 to S350 of the first mobile object recommendation processing (see FIG. 10 and FIG. 11). Assuming that Steps S1210 to S1235 and Steps S1240 to S1250 have already been described, detailed description on these steps is omitted. Thus, Step S1237, Steps S1255 to S1272, and Steps S1280 to S1285 are mainly described below.

If the at least one mobile object 600 corresponding to the activity demand of the user is found in Step S1235 (Step S1235: Yes), mobile object assignment determiner 210 extracts a service corresponding to an activity related to the activity demand of the user (Step S1255). Then, mobile object assignment determiner 210 generates a service request to inquire whether the extracted service can be provided, and then transmits the generated service request to service management device 300 (Step S1260).

If the service request is transmitted, service provider state manager 310 receives the transmitted service request (Step S1262).

If receiving the service request, service provider state manager 310 determines whether the service inquired in the service request can be provided (Step S1265). Then, service provider state manager 310 transmits a service availability indicating a result of the determination to mobile object management device 200 (Step S1270).

If the service availability is transmitted, mobile object assignment determiner 210 receives the transmitted service availability (Step S1271). Then, mobile object assignment determiner 210 checks whether the received service availability indicates that the service can be provided (Step S1272).

If it is checked in Step S1272 that the service can be provided (Step S1272: Yes), mobile object assignment determiner 210 determines mobile object 600 found in Step S1235 as the mobile object candidate that is to be recommended to the user. Then, mobile object assignment determiner 210 generates mobile object recommendation information to recommend the determined mobile object candidate to the user (Step S1237). After this, mobile object assignment determiner 210 proceeds to Step S1240.

If it is checked in Step S1272 that the service cannot be provided (Step S1272: No), mobile object assignment determiner 210 extracts mobile object 600 corresponding to a remaining activity demand of the user from among the at least one available mobile object 600 found in the vicinity of the location of the user in Step S1225 (Step S1280). Then, mobile object assignment determiner 210 checks whether at least one mobile object 600 corresponding to the remaining activity demand of the user is found as a result of the extraction (Step S1285).

If the at least one mobile object 600 corresponding to the activity demand of the user is found in Step S1285 (Step S1285: Yes), the fourth mobile object recommendation processing proceeds to Step S1255. If the processing proceeds to Step S1255 from Step S1285, "activity demand" is understood as "remaining activity demand" in Step S1255.

The fourth mobile object recommendation processing ends: if no available mobile object 600 is found in the vicinity of the location of the user in Step S1225 (Step S1225: No); if no mobile object 600 corresponding to the activity demand of the user is found in Step S1235 (Step S1235: No); no mobile object 600 corresponding to the remaining activity demand of the user is found in Step S1285 (Step S1285: No); or when Step S1250 ends.

[1-3. Discussion]

As described above, information processing system 1 enables the activity demand data of the user to be generated and enables the mobile object candidate that is to be recommended to the user to be determined in accordance with the activity demand data generated, without an explicit request from the user for use of a mobile object. Thus, information processing system 1 allows the user to use mobile object 600 that meets an activity demand of the user without an explicit request from the user for use of mobile object 600.

Embodiment 2

The following describes an information processing system according to Embodiment 2 that has a configuration partly different from the configuration of information processing system 1 according to Embodiment 1. This information processing system predicts an activity demand of user A and an activity demand of user B. If the activity demand of user A is identical to or similar to the activity demand of user B, the information processing system provides the same mobile object to user A and user B.

[2-1. Configuration of Information Processing System]

Figure 25:
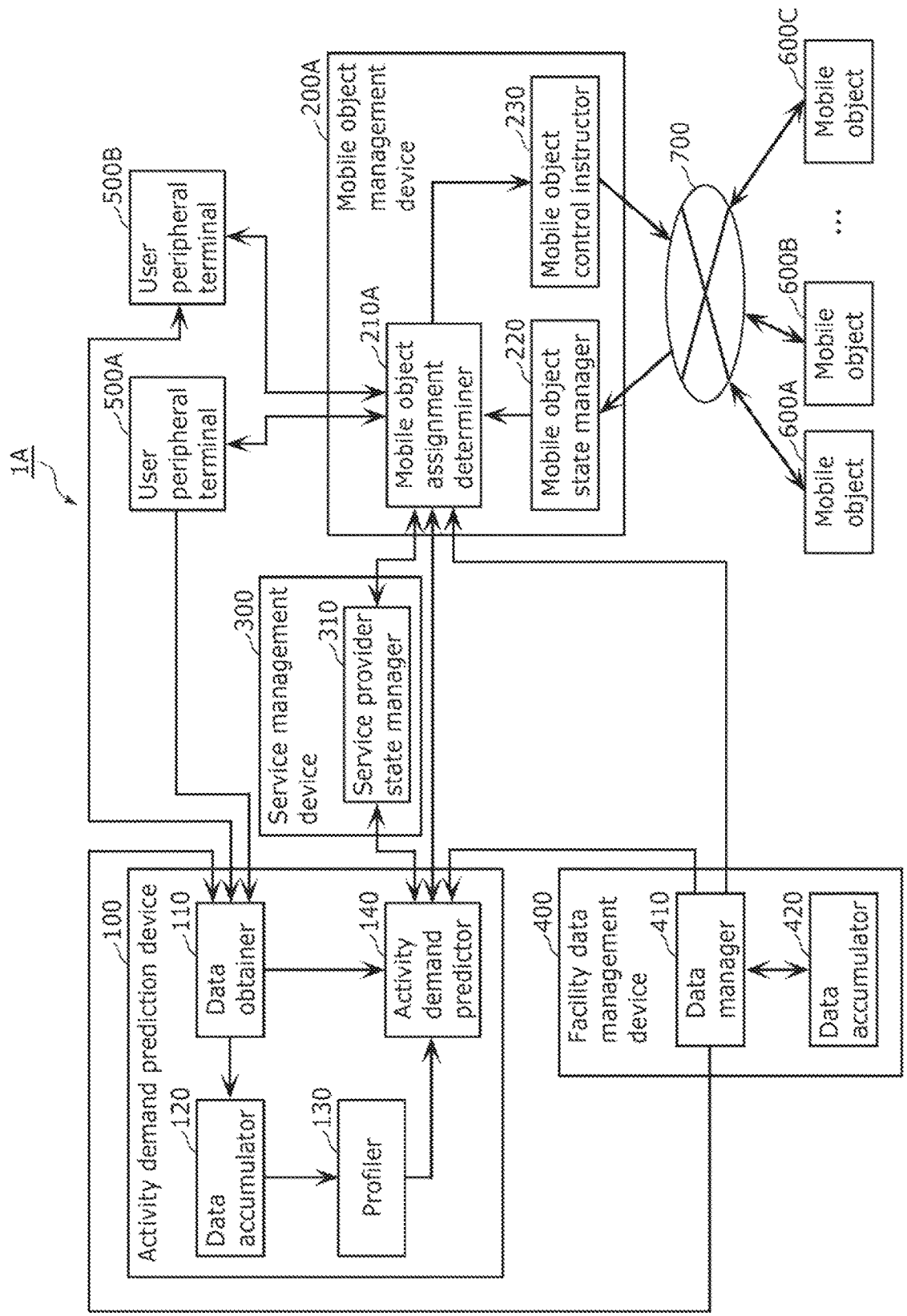
FIG. 25 is a block diagram illustrating a configuration of an information processing system according to Embodiment 2.

FIG. 25 is a block diagram illustrating the configuration of information processing system 1A according to Embodiment 2. In the following, constituent elements of information processing system 1A according to Embodiment 2 that are identical to those of information processing system 1 according to Embodiment 1 are assigned the same reference signs as used in Embodiment 1. Assuming that these identical constituent elements have already been described, detailed description on these constituent elements of information processing system 1A is omitted. Thus, points different from information processing system 1 are mainly described below.

As illustrated in FIG. 25, information processing system 1A is different from information processing system 1 according to Embodiment 1 in that mobile object assignment determiner 210A is provided instead of mobile object assignment determiner 210. This difference also changes mobile object management device 200 according to Embodiment 1 to mobile object management device 200A. Information processing system 1 according to Embodiment 1 includes at least one user peripheral terminal 500. In contrast, information processing system 1A includes: at least one user peripheral terminal 500A used by user A that uses information processing system 1A; and at least one user peripheral terminal 500B used by user B that uses information processing system 1A. Here, user peripheral terminal 500A is used by user A and similar to user peripheral terminal 500 according to Embodiment 1. Moreover, user peripheral terminal 500B is used by user B and similar to user peripheral terminal 500 according to Embodiment 1. Thus, assuming that user peripheral terminal 500A and user peripheral terminal 500B have already been described, detailed description on these terminals is omitted.

Mobile object assignment determiner 210A performs the following operation in addition to the operation performed by mobile object assignment determiner 210 according to Embodiment 1.

To be more specific, if the obtained activity demand data of user A is identical to or similar to the obtained activity demand data of user B, mobile object assignment determiner 210A further determines the determined mobile object candidate that is to be recommended to user A as the candidate that is to be recommended to user B.

[2-2. Operation of Information Processing System]

The following describes an operation performed by information processing system 1A having the above configuration.

Information processing system 1A performs fifth mobile object recommendation processing in addition to the processing performed by information processing system 1 according to Embodiment 1, for example.

The fifth mobile object recommendation processing is performed to recommend, to user B, the determined mobile object candidate that is to be recommended to user A, if a predetermined condition is satisfied.

Figure 26:
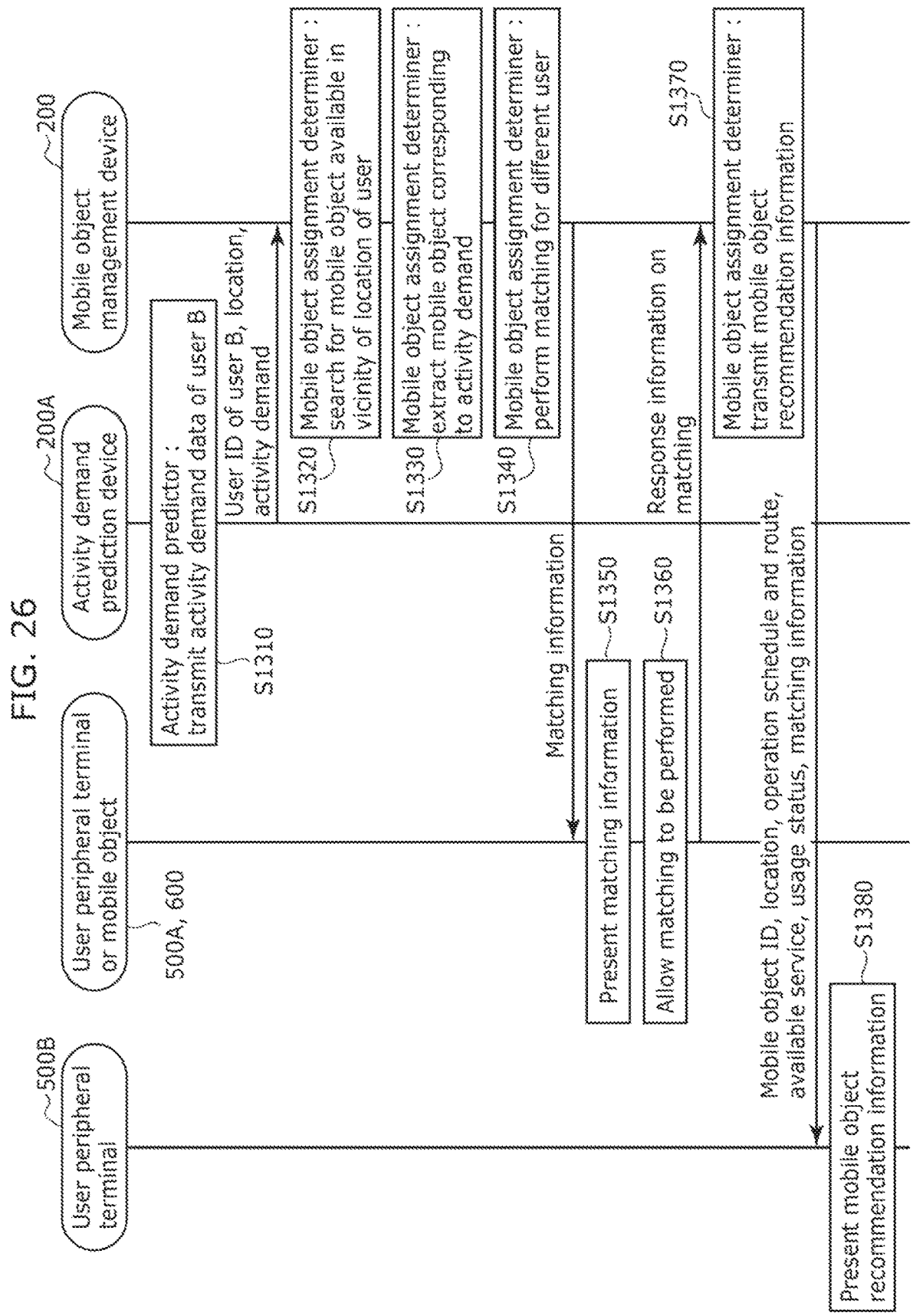
FIG. 26 is a sequence of fifth mobile object recommendation processing according to Embodiment 2.
Figure 27:
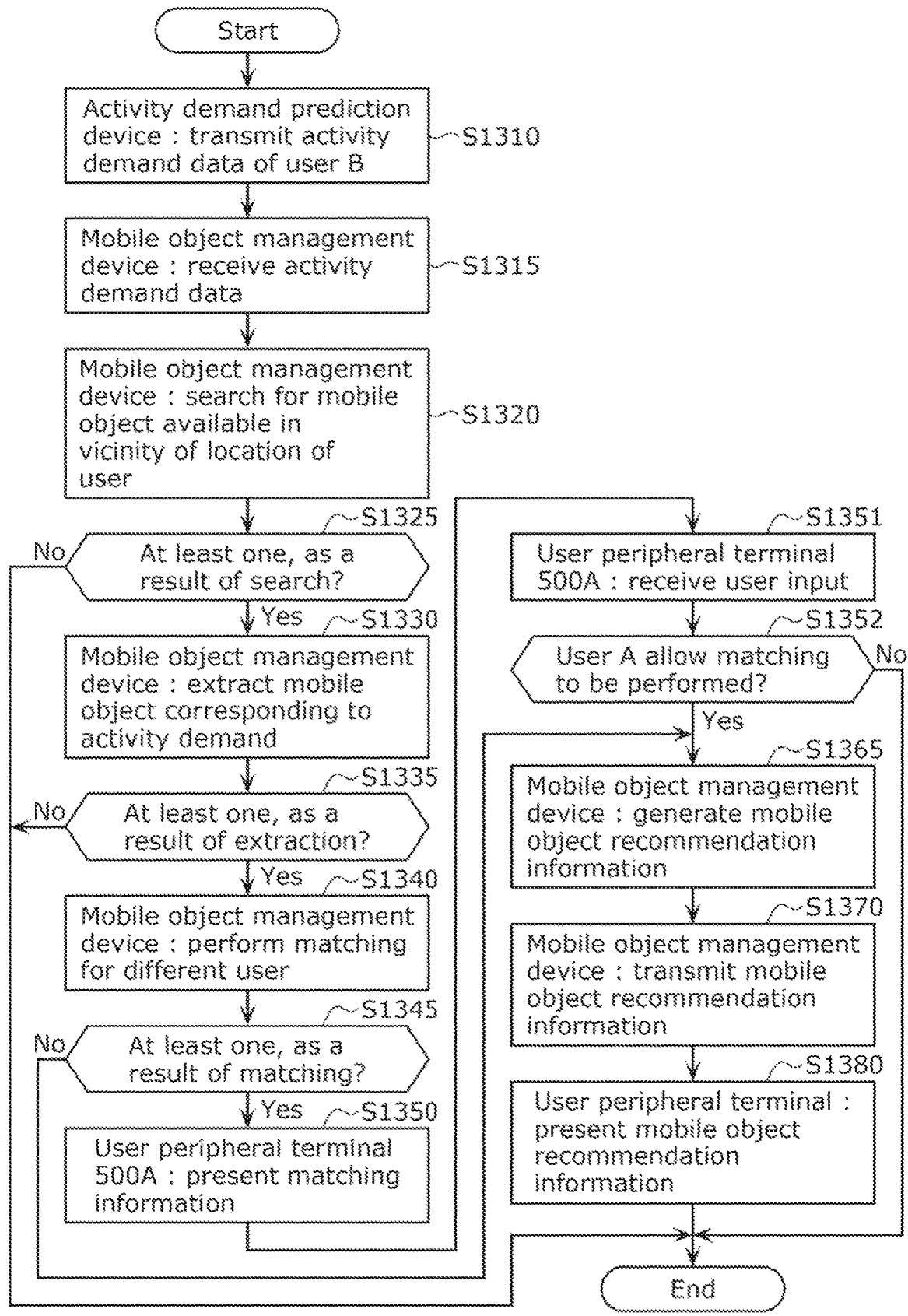
FIG. 27 is a flowchart of the fifth mobile object recommendation processing according to Embodiment 2.

FIG. 26 is a sequence of the fifth mobile object recommendation processing. FIG. 27 is a flowchart of the fifth mobile object recommendation processing.

Before the fifth mobile object recommendation processing is performed, mobile object assignment determiner 210A has already determined the mobile object candidate that is to be recommended to user A. In the fifth mobile object recommendation processing, activity demand predictor 140 generates activity demand data of user B that indicates the predicted activity demand of user B. For example, activity demand predictor 140 may predict the activity demand of user B through the execution of the activity demand prediction processing described above. In the present example, the activity demand data of user B includes a user ID that identifies user B, a date and time, a geographical location of user B, and at least one activity demand.

After generating the activity demand data of user B, activity demand predictor 140 transmits the generated activity demand data of user B to mobile object management device 200 (Step S1310).

If the activity demand data of user B is transmitted, mobile object assignment determiner 210A receives the transmitted activity demand data of user B (Step S1315). In accordance with the received activity demand data of user B, mobile object assignment determiner 210A searches for mobile object 600 available in the vicinity of user B (Step S1320). Then, mobile object assignment determiner 210A checks whether at least one available mobile object 600 is found in the vicinity of user B as a result of the search (Step S1325).

If the at least one available mobile object 600 is found in the vicinity of user B in Step S1325 (Step S1325: Yes), mobile object assignment determiner 210A extracts mobile object 600 corresponding to the activity demand of user B from among the at least one available mobile object 600 found in the vicinity of user B (Step S1330). Then, mobile object assignment determiner 210A checks whether at least one mobile object 600 corresponding to the activity demand of user B is found as a result of the extraction (Step S1335). Here, mobile object assignment determiner 210A may previously store a correspondence list between an activity demand and mobile object 600. Using this correspondence list, mobile object assignment determiner 210 may extract mobile object 600 corresponding to the activity demand of user B.

If the at least one mobile object 600 corresponding to the activity demand of user B is found in Step S1335 (Step S1335: Yes), mobile object assignment determiner 210A checks whether the at least one mobile object 600 found corresponding to the activity demand of user B is the mobile object candidate recommended to a user (user A in the present example) different from user B. More specifically, mobile object assignment determiner 210A checks whether matching is to be performed between the at least one mobile object 600 found corresponding to the activity demand of user B and a different user (Step S1340).

If it is checked in Step S1340 that the found mobile object 600 is to be matched with the different user (Step S1345: Yes), mobile object assignment determiner 210A generates matching information to inquire whether mobile object 600 is allowed to be recommended to the different user (user B in the present example). Then, mobile object assignment determiner 210A transmits the generated matching information to user peripheral terminal 500A. If user A is already riding in mobile object 600 that is recommended as the mobile object candidate, the generated matching information may be transmitted to mobile object 600 in which user A is riding, instead of user peripheral terminal 500A.

If the matching information is transmitted, user peripheral terminal 500A or mobile object 600 in which user A is riding receives the transmitted matching information and presents the received matching information to user A (Step S1350).

If the matching information is presented to user A, user A performs a user input indicating whether mobile object 600 is allowed to be recommended to user B. If the user input is performed, user peripheral terminal 500A or mobile object 600 in which user A is riding receives the user input (Step S1351). User peripheral terminal 500A or mobile object 600 in which user A is riding may include a touch panel, for example, and receive the user input by receiving an operation performed on the touch panel by user A. Receiving the user input, user peripheral terminal 500A or mobile object 600 in which user A is riding checks whether the received user input indicates that mobile object 600 is allowed to be recommended to user B, or more specifically, whether user A allows the matching to be performed between mobile object 600 and user B (Step S1352).

If user A allows the matching with user B in Step S1352 (Step S1352: Yes), user peripheral terminal 500A or mobile object 600 in which user A is riding generates matching response information indicating that the matching is allowed. Then, user peripheral terminal 500A or mobile object 600 in which user A is riding transmits the generated matching response information to mobile object management device 200. If the matching response information is transmitted, mobile object assignment determiner 210A receives the transmitted matching response information.

Mobile object assignment determiner 210A may receive the matching response information. It may be checked in Step S1345 that the found mobile object 600 is not to be matched with the different user (Step S1345: No). In these cases, mobile object assignment determiner 210A determines the at least one mobile object 600 found corresponding to the activity demand of user B in Step S1335 as the mobile object candidate that is to be recommended to user B. Then, mobile object assignment determiner 210A generates mobile object recommendation information to recommend the determined mobile object candidate to user B (Step S1365). Following this, mobile object assignment determiner 210A transmits the generated mobile object recommendation information to user peripheral terminal 500B (Step S1370). In the present example, the mobile object recommendation information includes a mobile object ID that identifies the mobile object candidate, a geographical location of the mobile object candidate, an operation schedule of the mobile object candidate, an operation route of the mobile object candidate, information indicating details of a service that can be provided by the mobile object candidate, information indicating a usage status of the mobile object candidate, and the matching information indicating that user A allows the matching.

If the mobile object recommendation information is transmitted, user peripheral terminal 500B receives the transmitted mobile object recommendation information. Then, user peripheral terminal 500B presents the received mobile object recommendation information to user B (Step S1380).

The fifth mobile object recommendation processing ends: if no available mobile object 600 is found in the vicinity of user B in Step S1325 (Step S1325: No); if no mobile object 600 corresponding to the activity demand of user B is found in Step S1335 (Step S1335: No); if user A does not allow the matching with user B in Step S1352 (Step S1352: No); or when Step S1380 ends.

[2-3. Discussion]

As described above, if an activity demand of a target user is identical to or similar to an activity demand of a different user, information processing system 1A is capable of recommending a mobile object candidate to this different user.

Other Embodiments

Although the information processing system in an aspect or aspects according to the present disclosure has been described by way of Embodiments 1 and 2 above, it should be obvious that the present invention is not limited to Embodiments described above. Other embodiments implemented through various changes and modifications conceived by a person of ordinary skill in the art or through a combination of the constituent elements in different embodiments described above may be included in the scope in an aspect or aspects according to the present disclosure, unless such changes, modifications, and combination depart from the scope of the present disclosure.

(1) Information processing system 1 according to Embodiment 1 includes activity demand prediction device 100, mobile object management device 200, service management device 300, facility data management device 400 as separate devices, as an example. However, information processing system 1 may be capable of achieving functions that are the same as those achieved by activity demand prediction device 100, mobile object management device 200, service management device 300, and facility data management device 400. In this case, activity demand prediction device 100, mobile object management device 200, service management device 300, and facility data management device 400 are not necessarily separate devices. For example, instead of including activity demand prediction device 100, mobile object management device 200, service management device 300, and facility data management device 400, information processing system 1 may include one device capable of achieving the functions of activity demand prediction device 100, mobile object management device 200, service management device 300, and facility data management device 400. Alternatively, information processing system 1 may include a plurality of devices capable of achieving the functions of activity demand prediction device 100, mobile object management device 200, service management device 300, and facility data management device 400. In this case, the plurality of devices may include a combination different from the combination of activity demand prediction device 100, mobile object management device 200, service management device 300, and facility data management device 400.

(2) In the fifth mobile object recommendation processing according to Embodiment 2, user peripheral terminal 500A or mobile object 600 in which user A is riding presents the matching information to user A and then receives the user input indicating whether mobile object 600 is allowed to be recommended to user B. However, before presenting the matching information to user A, user peripheral terminal 500A or mobile object 600 in which user A is riding may previously receive, from user A in the fifth mobile object recommendation processing, the user input indicating whether mobile object 600 is allowed to be recommended to user B.

(3) A part or all of the constituent elements in each of activity demand prediction device 100, mobile object management device 200, service management device 300, facility data management device 400, user peripheral terminal 500, and mobile object 600 may be implemented into a single system Large Scale Integration (LSI). The system LSI is a super multi-function LSI that is a single chip into which a plurality of constituent elements are integrated. More specifically, the system LSI is a computer system including a microprocessor, a read only memory (ROM), a random access memory (RAM), and the like. The ROM holds a computer program. The microprocessor operates according to the computer program, thereby causing the system LSI to execute its function.

Note that here, the terminology "system LSI circuit" is used, but depending on the degree of integration, the circuit may also referred to as IC, LSI circuit, super LSI circuit, or ultra LSI circuit. Moreover, the method of circuit integration is not limited to LSI, Integration may be realized with a specialized circuit or a general purpose processor. After the LSI circuit is manufactured, a field programmable gate array (FPGA) or a reconfigurable processor capable of reconfiguring the connections and settings of the circuit cells in the LSI circuit.

These integrated circuits may be formed as separate chips, or may be formed as one chip so as to include the entire configuration or part of the configuration of each embodiment.

(4) An aspect of the present disclosure may be not only the above-described information processing system, but also information processing method having steps performed by the characteristic constituent elements included in the information processing system. Furthermore, an aspect of the present disclosure may be a computer program that causes a computer to execute the characteristic steps included in the information processing method. In addition, an aspect of the present disclosure may be a non-transitory computer-readable recording medium on which the computer program is recorded.

(5) In the embodiments, each of the constituent elements may be a dedicated hardware or may be implemented by executing a software program suitable for the constituent element. Each of the constituent elements may be implemented by a program executer, such as a Central Processing Unit (CPU) or a processor, reading a software program from a recording medium, such as a hard disc or a semiconductor memory, and executing the software program.

INDUSTRIAL APPLICABILITY

The present disclosure is widely usable for a system that operates a mobile object.

The invention claimed is:

1. An information processing method executed by a computer, the information processing method comprising:
   obtaining (i) activity data of a user at a predetermined time point, (ii) profile data of one of the user and a different user who has an attribute that is identical to or similar to an attribute of the user, the profile data indicating one of an activity and a characteristic, and (iii) mobile object data;
   generating activity demand data of the user after the predetermined time point, in accordance with the profile data and the activity data of the user at the predetermined time point;
   determining a mobile object candidate that is to be recommended to the user, in accordance with the activity demand data of the user and the mobile object data;
   controlling notification about the mobile object candidate;
   receiving an order; and
   instructing to provide the mobile object candidate to the user in accordance of the order.

2. The information processing method according to claim 1,
   wherein in the determining of the mobile object candidate, a mobile object that enables an activity related to the activity demand data of the user inside the mobile object is determined as the mobile object candidate.

3. The information processing method according to claim 1,
   wherein the activity data of the user at the predetermined time point includes a first geographical location,
   the mobile object data includes a second geographical location, and
   in the determining of the mobile object candidate, a mobile object that is located within a predetermined distance from the user is determined as the mobile object candidate in accordance with the first geographical location.

4. The information processing method according to claim 3, further comprising:
   obtaining facility data; and
   searching for a facility candidate that is to be recommended to the user, in accordance with the activity demand data of the user and the facility data,
   wherein the controlling of the notification is performed in accordance with a result of the searching for the facility candidate.

5. The information processing method according to claim 4,
   wherein in the controlling of the notification,
   the mobile object candidate is notified when the facility candidate is not found within the predetermined distance from the user in the searching.

6. The information processing method according to claim 4,
   wherein the controlling of the notification is performed in accordance with a use condition of the facility candidate found in the searching and the profile data.

7. The information processing method according to claim 1,
   wherein in the determining of the mobile object candidate, at least one mobile object candidate is determined, as the mobile object candidate, from among a plurality of mobile object candidates in accordance with the activity demand data.

8. The information processing method according to claim 1, further comprising:
   obtaining service provider data; and
   performing matching between the activity demand of the user and a service provider, in accordance with the activity demand data of the user and the service provider data,
   wherein the determining of the mobile object candidate is performed in accordance with a result of the performing of the matching.

9. The information processing method according to claim 1, further comprising:
   obtaining service provider data; and
   searching for a service provider that is capable of providing a service corresponding to an activity related to the activity demand of the user, in accordance with the activity demand data of the user and the service provider data, wherein the determining of the mobile object candidate is performed in accordance with a result of the searching.

10. The information processing method according to claim 1, further comprising:

obtaining (i) activity data of a different user, other than the user, at the predetermined time point, and (ii) profile data of one of the different user and an other user who has an attribute that is identical to or similar to an attribute of the different user;

generating activity demand data of the different user after the predetermined time point, in accordance with: the profile data of the one of the different user and the other user who has the attribute that is identical to or similar to the attribute of the different user; and the activity data of the different user at the predetermined time point; and determining the mobile object candidate as a candidate that is to be recommended to the different user, when the activity demand data of the user is identical to or similar to the activity demand data of the different user.

11. The information processing method according to claim 1, further comprising:

receiving one of a service identifier and location information;

generating the activity demand data of the user, in accordance with (i) the activity data of the user at the predetermined time point and (ii) the profile data of the user identified by one of the service identifier and the location information; and transmitting the activity demand data generated in the generating, in response to the receiving.

12. The information processing method according to claim 1, further comprising:

receiving identification information that identifies target activity demand data;

determining whether the target activity demand data identified by the identification information matches the activity demand data of the user which is generated in the generating;

obtaining a user identifier that identifies the user corresponding to the target activity demand data when the target activity demand data is determined to match the activity demand data of the user which is generated; and transmitting the user identifier in response to the receiving.

13. An information processing method executed by a computer, the information processing method comprising:

transmitting a request for activity demand data of a user;

receiving the activity demand data of the user as a response to the request;

obtaining mobile object data;

determining a mobile object candidate that is to be recommended to the user, in accordance with the activity demand data of the user and the mobile object data;

notifying the user about the mobile object candidate;

receiving an order; and instructing to provide the mobile object candidate to the user in accordance with the order.

14. An information processing system, comprising:

a processor; and a memory that stores a program;

wherein, when the program is executed by the processor, the program causes the processor to function as;

an obtainer that obtains (i) activity data of a user at a predetermined time point, (ii) profile data of one of the user and a different user who has an attribute that is identical to or similar to an attribute of the user, the profile data indicating one of an activity and a characteristic, and (iii) mobile object data;

a generator that generates activity demand data of the user after the predetermined time point, in accordance with the profile data and the activity data of the user at the predetermined time point;

a determiner that determines a mobile object candidate that is to be recommended to the user, in accordance with the activity demand data of the user and the mobile object data;

a controller that controls notification about the mobile object candidate;

a receiver that receives an order; and a mobile object provision instructor that instructs to provide the mobile object candidate to the user in accordance with the order.

* * * * *